(12) United States Patent
Ayai

(10) Patent No.: US 9,748,865 B2
(45) Date of Patent: Aug. 29, 2017

(54) POWER CONVERSION DEVICE AND THREE-PHASE ALTERNATING CURRENT POWER SUPPLY DEVICE

(71) Applicant: Sumitomo Electric Industries, Ltd., Osaka-shi (JP)

(72) Inventor: Naoki Ayai, Osaka (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 0 days.

(21) Appl. No.: 15/110,510

(22) PCT Filed: Jan. 5, 2015

(86) PCT No.: PCT/JP2015/050044
§ 371 (c)(1),
(2) Date: Jul. 8, 2016

(87) PCT Pub. No.: WO2015/105069
PCT Pub. Date: Jul. 16, 2015

(65) Prior Publication Data
US 2016/0336873 A1 Nov. 17, 2016

(30) Foreign Application Priority Data
Jan. 10, 2014 (JP) .................. 2014-003642

(51) Int. Cl.
*H02M 7/5387* (2007.01)
*H02M 3/335* (2006.01)
(Continued)

(52) U.S. Cl.
CPC .......... *H02M 7/5387* (2013.01); *H02M 1/12* (2013.01); *H02M 3/33576* (2013.01);
(Continued)

(58) Field of Classification Search
CPC .. H02M 1/32; H02M 3/33569; H02M 7/5387; H02M 7/53871; H02M 7/521; H02M 7/5383
(Continued)

(56) References Cited

U.S. PATENT DOCUMENTS

| 5,757,633 | A | * | 5/1998 | Bowles | .................. | H02M 7/49 363/41 |
| 6,058,032 | A | | 5/2000 | Yamanaka et al. | | |

(Continued)

FOREIGN PATENT DOCUMENTS

| JP | S63-313668 A | 12/1988 |
| JP | H10-070886 A | 3/1998 |

(Continued)

OTHER PUBLICATIONS

International Search Report in International Application No. PCT/JP2015/050044, dated Mar. 24, 2015.

*Primary Examiner* — Adolf Berhane
(74) *Attorney, Agent, or Firm* — Venable LLP; Michael A. Sartori; Laura G. Remus

(57) ABSTRACT

Provided is a power conversion device including: a conversion device for each phase which converts DC voltage inputted from a DC power supply, to voltage having an AC waveform to be outputted to each phase with respect to a neutral point of three-phase AC; and a control unit which controls these conversion devices. Each conversion device includes: a first converter which has a DC/DC converter including an isolation transformer, and a capacitor, and which converts the inputted DC voltage to voltage containing a pulsating DC voltage waveform corresponding to the absolute value of the AC waveform to be outputted; and a second converter which is provided at a stage subsequent to the first converter and has a full-bridge inverter, and which inverts the polarity of the voltage containing the pulsating (Continued)

DC voltage waveform, per one cycle, thereby converting the voltage to voltage having the AC waveform.

9 Claims, 16 Drawing Sheets

(51) Int. Cl.
  *H02M 1/12* (2006.01)
  *H02M 7/49* (2007.01)
  *H02M 1/00* (2006.01)
(52) U.S. Cl.
  CPC ........ *H02M 7/49* (2013.01); *H02M 2001/007* (2013.01); *H02M 2001/0083* (2013.01)
(58) Field of Classification Search
  USPC .................................. 363/17, 56.02, 98, 132
  See application file for complete search history.

(56) References Cited

U.S. PATENT DOCUMENTS

| | | | | |
|---|---|---|---|---|
| 6,330,170 | B1* | 12/2001 | Wang | H02J 9/062 363/17 |
| 6,404,655 | B1* | 6/2002 | Welches | H02M 7/4807 363/17 |
| 6,466,468 | B1 | 10/2002 | York | |
| 8,587,976 | B2* | 11/2013 | Rigbers | H02M 3/335 363/132 |
| 8,625,307 | B2* | 1/2014 | Iwata | H02M 7/49 363/131 |
| 8,699,237 | B2* | 4/2014 | Pan | H02M 1/34 363/131 |
| 8,730,702 | B2* | 5/2014 | Stern | H02M 7/5395 363/131 |
| 8,736,102 | B1* | 5/2014 | Gao | H02M 3/28 307/17 |
| 8,737,100 | B2* | 5/2014 | Chapman | H02M 7/537 363/95 |
| 8,773,876 | B2* | 7/2014 | Kuboyama | H02M 7/487 363/132 |
| 8,867,247 | B2* | 10/2014 | Bando | H02M 7/5395 363/98 |
| 8,879,285 | B2* | 11/2014 | Asakura | H02M 7/53871 363/132 |
| 8,958,219 | B2* | 2/2015 | Xu | H02M 7/5388 363/41 |
| 8,971,082 | B2* | 3/2015 | Rodriquez | H02M 7/48 363/131 |
| 9,000,705 | B2* | 4/2015 | Kaidu | H02P 27/08 318/400.06 |
| 9,030,852 | B2* | 5/2015 | Wijekoon | H02M 5/297 363/131 |
| 2005/0111245 | A1* | 5/2005 | Lai | H02M 5/293 363/125 |
| 2005/0284673 | A1 | 12/2005 | Nakazawa et al. | |
| 2009/0116266 | A1* | 5/2009 | Lai | H02M 7/493 363/40 |
| 2010/0232191 | A1 | 9/2010 | Mabuchi et al. | |
| 2012/0081934 | A1* | 4/2012 | Garrity | H02M 7/46 363/37 |
| 2013/0343089 | A1* | 12/2013 | Gupta | H02M 7/4807 363/16 |
| 2014/0306543 | A1* | 10/2014 | Garrity | H02M 7/44 307/82 |
| 2016/0372926 | A1* | 12/2016 | Pahlevaninezhad | H02J 3/382 |
| 2017/0005584 | A1* | 1/2017 | Guepratte | H02M 3/335 |

FOREIGN PATENT DOCUMENTS

| | | |
|---|---|---|
| JP | 2006-025591 A | 1/2006 |
| JP | 2007-325456 A | 12/2007 |
| JP | 2010-220321 A | 9/2010 |
| JP | 5260092 B2 | 8/2013 |

* cited by examiner

US 9,748,865 B2

POWER CONVERSION DEVICE AND THREE-PHASE ALTERNATING CURRENT POWER SUPPLY DEVICE

TECHNICAL FIELD

The present invention relates to a three-phase AC power supply device for generating three-phase AC power from DC power, and to a power conversion device used therefor.

BACKGROUND ART

Power conversion devices that step up DC voltage inputted from a DC power supply by a DC/DC converter, convert the resultant voltage to AC voltage by an inverter, and output the AC voltage, are often used for a stand-alone power supply, a UPS (Uninterruptible Power Supply), and the like. In such a power conversion device, the DC/DC converter constantly performs switching operation, and the inverter also constantly performs switching operation.

Also, by using a three-phase inverter, voltage of the DC power supply can be converted to three-phase AC voltage (for example, see Patent Literature 1 (FIG. 7)).

FIG. 16 is an example of a circuit diagram of a power conversion device used in the case of supplying power from a DC power supply to a three-phase AC load. In FIG. 16, a power conversion device 200 generates AC power on the basis of DC power received from a DC power supply 201, and supplies the power to a three-phase AC load 220.

The power conversion device 200 includes: a capacitor 202; for example, three step-up circuits 203; a smoothing circuit 205 for smoothing voltage of a DC bus 204; a three-phase inverter circuit 207; and three pairs of AC reactors 208 to 210 and capacitors 211 to 213. The smoothing circuit 205 is formed by connecting two capacitors 206 in series for the purpose of obtaining the withstand voltage property and connecting six sets of such two capacitors 206 in parallel for the purpose of obtaining the capacitance. The capacitance of the smoothing circuit as a whole is several mF, for example.

The step-up circuit 203 steps up voltage which has been caused to have a high frequency through switching, by an isolation transformer 203t, and then rectifies the stepped-up voltage. The three step-up circuits 203 are connected in parallel to the common DC bus 204. The outputs of the three step-up circuits 203 are smoothed by the smoothing circuit 205 having a large capacitance, to become the voltage of the DC bus 204. This voltage is subjected to switching by the three-phase inverter circuit 207, thereby generating three-phase AC voltage including a high-frequency component. The high-frequency component is removed by the AC reactors 208 to 210 and the capacitors 211 to 213, whereby three-phase AC voltage (or power) that can be provided to the three-phase AC load 220 is obtained. The line-to-line voltage of the three-phase AC load 220 is 400V.

Here, the voltage of the DC bus 204 is required to be equal to or higher than the wave crest value of AC 400V, which is 400×√2, i.e., about 566V, but is set at 600V, considering some margin. In the case where the voltage of the DC bus 204 is 600V, when a switching element in the three-phase inverter circuit 207 is turned off, due to resonance by a floating inductance and the capacitance of the switching element, voltage that greatly exceeds 600V is applied to the switching element. Therefore, in order to reliably prevent insulation breakdown of the switching element, for example, withstand voltage property of 1200V which is twice as high as the voltage of the DC bus is required. In addition, the withstand voltage property of 1200V is also required for the smoothing circuit 205, and in the configuration in FIG. 16, withstand voltage property of 600V is required for each capacitor.

CITATION LIST

Patent Literature

PATENT LITERATURE 1: Japanese Patent No. 5260092

SUMMARY OF INVENTION

Technical Problem

In the conventional power conversion device as described above, further improvement in the conversion efficiency is required. In order to improve the conversion efficiency, it is effective to reduce switching loss. In general, the higher the voltage of the DC bus is, the greater the switching loss and the like are. Therefore, how to reduce the voltage of the DC bus is a problem. In addition, it is desired to reduce the switching loss and other power losses also by means other than the reduction in the voltage.

In view of the above problems, an object of the present invention is to reduce power loss due to conversion in a three-phase AC power supply device for converting DC voltage inputted from a DC power supply to three-phase AC voltage, and in a power conversion device used therefor.

Solution to Problem

The present invention is a power conversion device for converting DC voltage inputted from a DC power supply, to three-phase AC voltage, the power conversion device including: a first-phase conversion device configured to convert the DC voltage inputted from the DC power supply, to voltage having an AC waveform to be outputted to a first phase with respect to a neutral point of three-phase AC; a second-phase conversion device configured to convert the DC voltage inputted from the DC power supply, to voltage having an AC waveform to be outputted to a second phase with respect to the neutral point; a third-phase conversion device configured to convert the DC voltage inputted from the DC power supply, to voltage having an AC waveform to be outputted to a third phase with respect to the neutral point; and a control unit configured to control the first-phase conversion device, the second-phase conversion device, and the third-phase conversion device, wherein each of the first-phase conversion device, the second-phase conversion device, and the third-phase conversion device includes: a first converter having a DC/DC converter including an isolation transformer, and a smoothing capacitor, the first converter converting, by the DC/DC converter controlled by the control unit, the inputted DC voltage to voltage containing a pulsating DC voltage waveform corresponding to an absolute value of the AC waveform to be outputted; and a second converter provided at a stage subsequent to the first converter and having a full-bridge inverter, the second converter inverting, by the full-bridge inverter controlled by the control unit, a polarity of the voltage containing the pulsating DC voltage waveform, per one cycle, thereby converting the voltage to voltage having the AC waveform.

Also, the present invention is a three-phase AC power supply device including: a DC power supply; a first-phase conversion device configured to convert the DC voltage inputted from the DC power supply, to voltage having an AC waveform to be outputted to a first phase with respect to a neutral point of three-phase AC; a second-phase conversion device configured to convert the DC voltage inputted from the DC power supply, to voltage having an AC waveform to be outputted to a second phase with respect to the neutral point; a third-phase conversion device configured to convert the DC voltage inputted from the DC power supply, to voltage having an AC waveform to be outputted to a third phase with respect to the neutral point; and a control unit configured to control the first-phase conversion device, the second-phase conversion device, and the third-phase conversion device, wherein each of the first-phase conversion device, the second-phase conversion device, and the third-phase conversion device includes: a first converter having a DC/DC converter including an isolation transformer, and a smoothing capacitor, the first converter converting, by the DC/DC converter controlled by the control unit, the inputted DC voltage to voltage containing a pulsating DC voltage waveform corresponding to an absolute value of the AC waveform to be outputted; and a second converter provided at a stage subsequent to the first converter and having a full-bridge inverter, the second converter inverting, by the full-bridge inverter controlled by the control unit, a polarity of the voltage containing the pulsating DC voltage waveform, per one cycle, thereby converting the voltage to voltage having the AC waveform.

Advantageous Effects of Invention

The power conversion device and the three-phase AC power supply device of the present invention enable reduction in power loss due to conversion.

DESCRIPTION OF EMBODIMENTS

Summary of Embodiments

Figure 1:
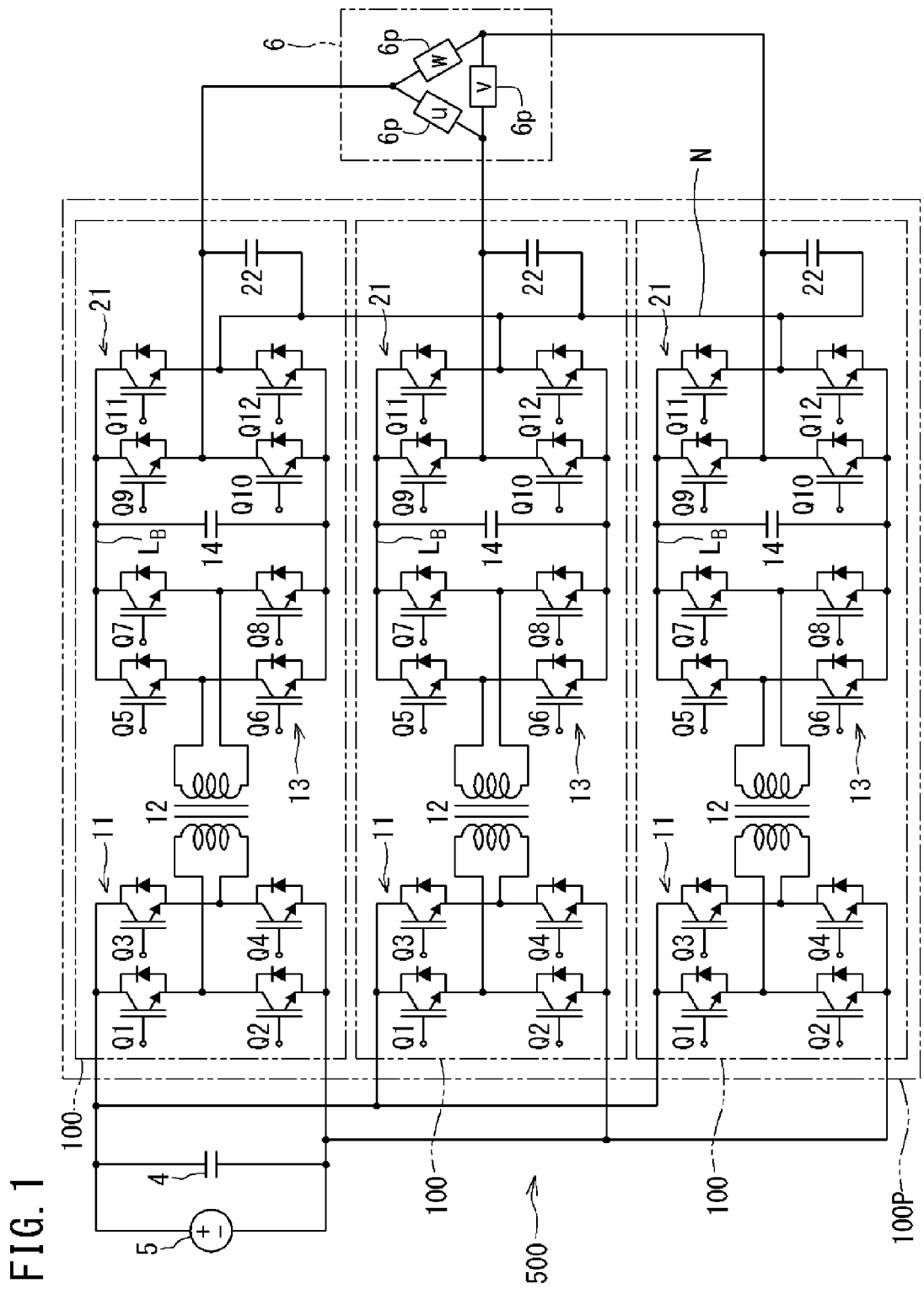
FIG. 1 is a circuit diagram showing a three-phase AC power supply device according to the first embodiment.

Summary of the embodiments of the present invention includes at least the following.

(1) This is a power conversion device for converting DC voltage inputted from a DC power supply, to three-phase AC voltage, the power conversion device including: a first-phase conversion device configured to convert the DC voltage inputted from the DC power supply, to voltage having an AC waveform to be outputted to a first phase with respect to a neutral point of three-phase AC; a second-phase conversion device configured to convert the DC voltage inputted from the DC power supply, to voltage having an AC waveform to be outputted to a second phase with respect to the neutral point; a third-phase conversion device configured to convert the DC voltage inputted from the DC power supply, to voltage having an AC waveform to be outputted to a third phase with respect to the neutral point; and a control unit configured to control the first-phase conversion device, the second-phase conversion device, and the third-phase conversion device, wherein each of the first-phase conversion device, the second-phase conversion device, and the third-phase conversion device includes: a first converter having a DC/DC converter including an isolation transformer, and a smoothing capacitor, the first converter converting, by the DC/DC converter controlled by the control unit, the inputted DC voltage to voltage containing a pulsating DC voltage waveform corresponding to an absolute value of the AC waveform to be outputted; and a second converter provided at a stage subsequent to the first converter and having a full-bridge inverter, the second converter inverting, by the full-bridge inverter controlled by the control unit, a polarity of the voltage containing the pulsating DC voltage waveform, per one cycle, thereby converting the voltage to voltage having the AC waveform.

In the power conversion device of the above (1), since the conversion devices (first phase, second phase, third phase) are provided for the respective phases and output the phase voltages, voltage $V_{AC}$ (effective value) to be outputted from each conversion device is $(1/\sqrt{3})$ of the line-to-line voltage of the three-phase AC. For voltage $V_B$ of a DC bus, the wave crest value of the voltage $V_{AC}$ is sufficient, i.e., $V_B = \sqrt{2} \cdot V_{AC}$. As a result, the voltage of the DC bus is reduced as compared to the case where the line-to-line voltage is supplied by a single three-phase inverter.

Owing to voltage reduction in the DC bus, switching loss in the switching elements is reduced. In addition, even in the case where a reactor is provided in the device, iron loss thereof is reduced. Further, for the switching elements and the smoothing capacitor connected to the DC bus, even the ones having low withstand voltage properties can be used. Since a switching element having a lower withstand voltage property has a lower ON resistance, conduction loss can be reduced.

In the power conversion device as described above, although the hardware configuration of the first converter is a DC/DC converter, the DC voltage is converted to, not mere DC voltage, but voltage containing a pulsating DC voltage waveform corresponding to the absolute value of the AC waveform. Thus, a waveform as a base of the AC waveform is generated by the first converter. Then, the second converter inverts the polarity of the voltage containing the pulsating DC voltage waveform, per one cycle, thereby converting the voltage to the target voltage of the AC waveform. The number of times of switching in the full-bridge inverter of the second converter in this case is drastically decreased as compared to that in the conventional switching operation, and voltage at the time of the switching is low. Therefore, switching loss in the second converter is greatly reduced. Even in the case where a reactor is provided in the second converter, iron loss thereof is reduced. Further, the capacitor of the first converter smoothes only high-frequency voltage variation but does not smooth the pulsating DC voltage waveform having a low frequency. Therefore, it is possible to use a capacitor with a low capacitance.

(2) In the power conversion device of (1), the first converter may convert the DC voltage to voltage having the consecutive pulsating DC voltage waveform.

In this case, the waveform with a half cycle as a base of the AC waveform is entirely generated by the first converter, and the second converter only performs polarity inversion at a frequency twice as high as the frequency of the AC waveform to be outputted. That is, the second converter does not perform switching operation accompanied by high-frequency switching. Therefore, an AC reactor is not needed on the output side of the second converter, and thus loss due to the AC reactor can be eliminated.

(3) In the power conversion device of (1), during a period in which the voltage outputted from the first converter is equal to or lower than a predetermined proportion of a wave crest value of the pulsating DC voltage waveform, the control unit may cause the full-bridge inverter to perform switching operation at a high frequency, thereby generating voltage having the AC waveform in the period.

The period during which the voltage is equal to or lower than a predetermined proportion of the wave crest value of the pulsating DC voltage waveform means the vicinity of zero cross of the target voltage. That is, in this case, in the vicinity of zero cross of the target voltage, the second converter contributes to generation of the AC waveform, and in the other region, the first converter contributes to generation of the AC waveform. In the case where a pulsating DC voltage waveform in the entire region is generated by only the first converter, the waveform in the vicinity of zero cross might be distorted. However, by locally using switching operation of the second converter, such distortion of the waveform is prevented, and output of a smoother AC waveform can be obtained. Since the period during which the second converter is caused to perform switching operation is short, loss is smaller than in the conventional switching operation. In addition, loss due to the AC reactor is also smaller.

(4) The predetermined proportion in (3) is preferably 18% to 35%.

In this case, it is possible to prevent distortion of the waveform in the vicinity of zero cross, and sufficiently obtain the effect of loss reduction. For example, if the "predetermined proportion" is lower than 18%, there is a possibility that slight distortion is left in the vicinity of zero cross. If the "predetermined proportion" is higher than 35%, the period during which the second converter 2 performs high-frequency switching operation is prolonged, and the effect of loss reduction is reduced by an amount corresponding to the prolonged period.

(5) In the power conversion device of any one of (1) to (4), preferably, the capacitor has such a capacitance that allows high-frequency voltage variation due to switching in the first converter to be smoothed but does not allow the pulsating DC voltage waveform to be smoothed.

In this case, it is possible to obtain a desired pulsating DC voltage waveform while eliminating high-frequency voltage variation due to switching.

(6) On the other hand, a three-phase AC power supply device includes: a DC power supply; a first-phase conversion device configured to convert the DC voltage inputted from the DC power supply, to voltage having an AC waveform to be outputted to a first phase with respect to a neutral point of three-phase AC; a second-phase conversion device configured to convert the DC voltage inputted from the DC power supply, to voltage having an AC waveform to be outputted to a second phase with respect to the neutral point; a third-phase conversion device configured to convert the DC voltage inputted from the DC power supply, to voltage having an AC waveform to be outputted to a third phase with respect to the neutral point; and a control unit configured to control the first-phase conversion device, the second-phase conversion device, and the third-phase conversion device, wherein each of the first-phase conversion device, the second-phase conversion device, and the third-phase conversion device includes: a first converter having a DC/DC converter including an isolation transformer, and a smoothing capacitor, the first converter converting, by the DC/DC converter controlled by the control unit, the inputted DC voltage to voltage containing a pulsating DC voltage waveform corresponding to an absolute value of the AC waveform to be outputted; and a second converter provided at a stage subsequent to the first converter and having a full-bridge inverter, the second converter inverting, by the full-bridge inverter controlled by the control unit, a polarity of the voltage containing the pulsating DC voltage waveform, per one cycle, thereby converting the voltage to voltage having the AC waveform.

Also in this case, the same operation and effect as in the power conversion device of (1) are provided.

Details of Embodiments

Hereinafter, embodiments of the present invention will be described in detail with reference to the drawings.

<<First Embodiment of Three-Phase AC Power Supply Device and Power Conversion Device>>

FIG. 1 is a circuit diagram showing a three-phase AC power supply device 500 according to the first embodiment. The three-phase AC power supply device 500 includes a power conversion device 100P, and a DC power supply 5 composed of, for example, a storage battery, and is connected to a three-phase AC load 6.

The power conversion device 100P is composed of three conversion devices (first conversion device, second conversion device, third conversion device) 100 provided for the respective phases of the three-phase AC. The conversion device 100 converts DC power inputted from the DC power supply 5, to AC power, and supplies the AC power to the three-phase AC load 6. The three conversion devices 100 each supply AC power with the phase voltage with respect to a neutral point N of the three-phase AC, and the three conversion devices 100 as a whole supply AC power with line-to-line voltage to respective phase loads 6p (first phase (u), second phase (v), third phase (w)).

In the case where the line-to-line voltage of the three-phase AC load 6 is 400V, the phase voltage is about 231V (=400V/$\sqrt{3}$). Each conversion device 100 that outputs the phase voltage requires about 327V (=(400V/$\sqrt{3}$)×$\sqrt{2}$) as the voltage of a DC bus $L_B$. This means that the voltage of the DC bus $L_B$ is reduced (566V→327V) as compared to the case where the line-to-line voltage (400V) to the three-phase AC load 6 is supplied by a single three-phase inverter. Therefore, the withstand voltage properties of switching elements and other electronic devices do not require 1200V, but about 600V is sufficient.

Figure 2:
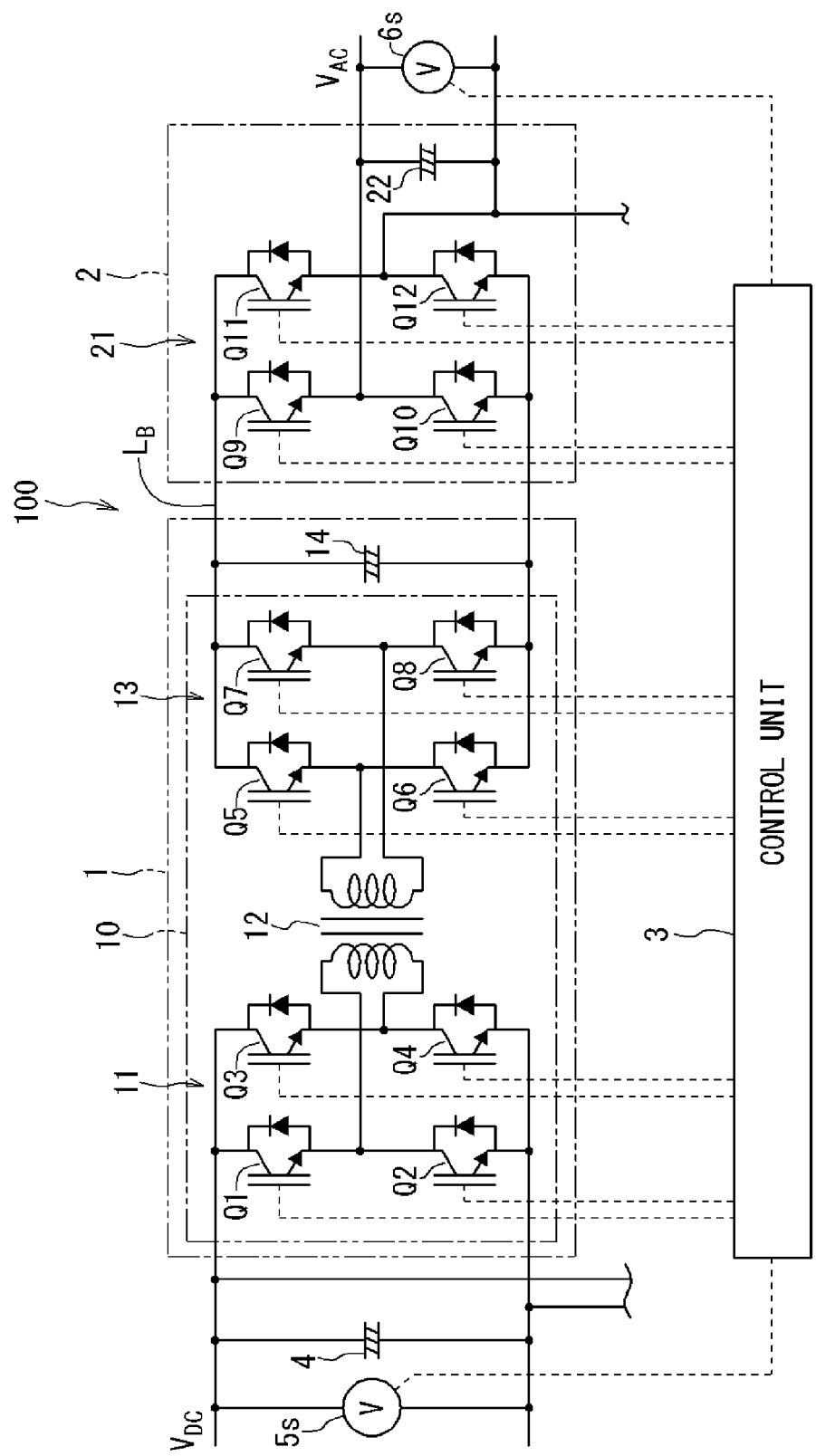
FIG. 2 is a diagram showing in more detail an internal circuit of a conversion device for one phase in FIG. 1.

FIG. 2 is a diagram showing in more detail an internal circuit of the conversion device 100 for one phase in FIG. 1.

The conversion device 100 converts inputted DC voltage $V_{DC}$ to AC voltage $V_{AC}$ corresponding to target voltage for the AC waveform, and outputs the AC voltage $V_{AC}$. Although the conversion device 100 is also capable of conversion from AC to DC, here, the description will be given mainly focusing on conversion from DC to AC (the same applies also in the second embodiment and the third embodiment).

In FIG. 2, the conversion device 100 includes, as main components, a first converter 1, a second converter 2, and a control unit 3. The first converter 1 receives the DC voltage $V_{DC}$ via a smoothing capacitor 4. The DC voltage $V_{DC}$ is detected by a voltage sensor $5_S$, and information about the detected voltage is sent to the control unit 3. The AC voltage $V_{AC}$ which is output voltage of the second converter 2 is detected by a voltage sensor $6_S$, and information about the detected voltage is sent to the control unit 3.

The first converter 1 includes a DC/DC converter 10 and a smoothing capacitor 14.

The DC/DC converter 10 includes, from the input side: a full-bridge circuit 11 composed of four switching elements Q1, Q2, Q3, Q4; an isolation transformer 12; and a rectifier circuit 13 composed of four switching elements Q5, Q6, Q7, Q8, and these are connected as shown in FIG. 2.

The second converter 2 includes: a full-bridge inverter 21 composed of four switching elements Q9, Q10, Q11, Q12; and a capacitor 22. Output of the second converter 2 becomes the AC voltage $V_{AC}$ having a desired AC waveform.

The switching elements Q1 to Q12 are controlled by the control unit 3. As the switching elements Q1 to Q12, for example, IGBTs (Insulated Gate Bipolar Transistors) or FETs (Field Effect Transistors) may be used.

As described above, the voltage of the DC bus $L_B$ is reduced as compared to the case where the line-to-line voltage (400V) to the three-phase AC load 6 is supplied by a single three-phase inverter. Therefore, switching loss in the switching elements Q5 to Q12 in the conversion device 100 is reduced. In addition, iron loss in the isolation transformer 12 is also reduced.

Further, for the switching elements Q5 to Q12 and the smoothing capacitor 14 connected to the DC bus $L_B$, even the ones having low withstand voltage properties can be used. Since a switching element having a lower withstand voltage property has a lower ON resistance, conduction loss can be reduced.

Next, operation of the conversion device 100 will be described. First, the control unit 3 performs PWM control for the full-bridge circuit 11 (switching elements Q1 to Q4) of the first converter 1.

Figure 3:
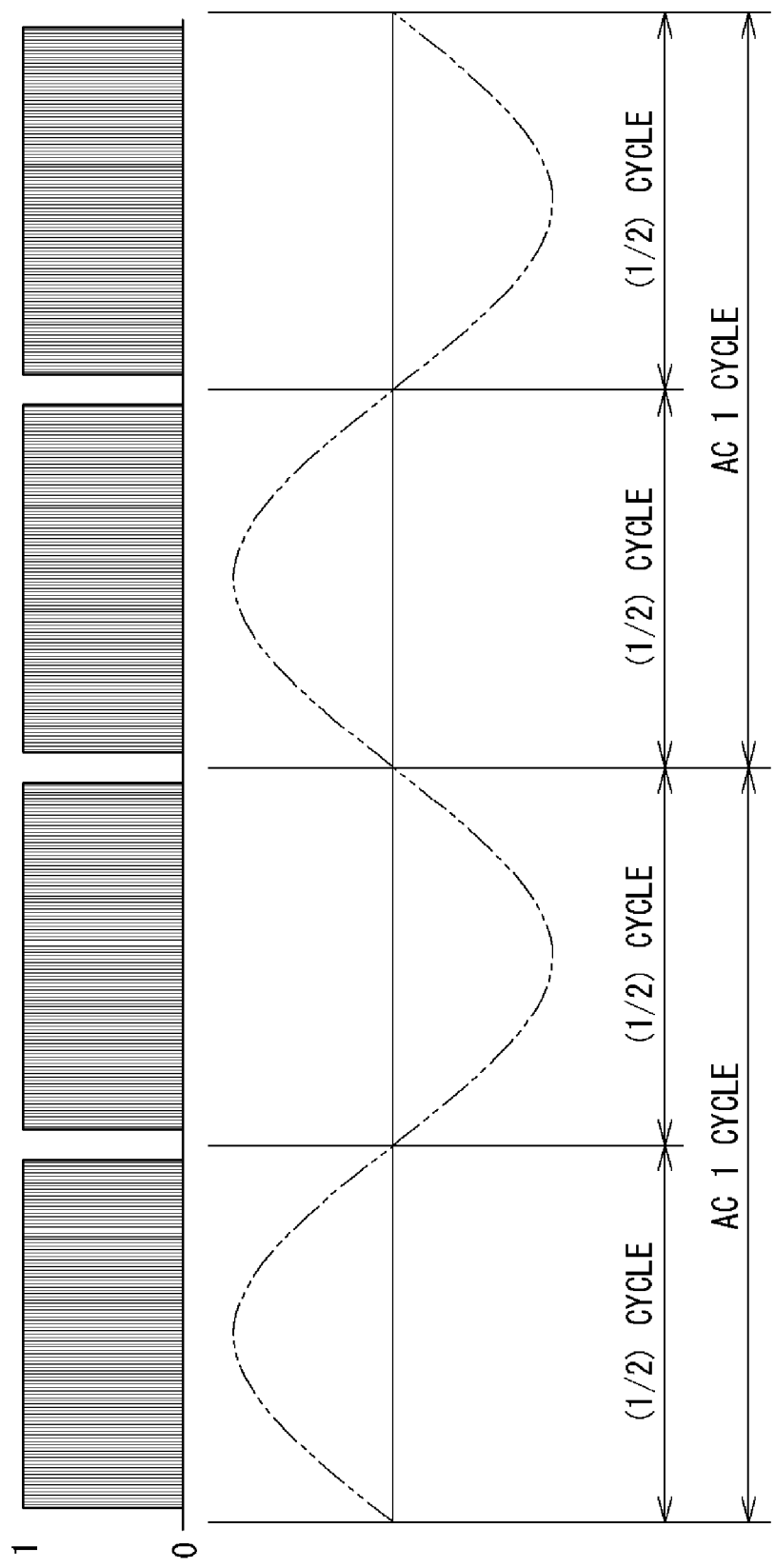
FIG. 3 is a diagram showing a gate drive pulse for a full-bridge circuit.

FIG. 3 is a diagram showing a gate drive pulse for the full-bridge circuit 11. In FIG. 3, a waveform indicated by a two-dot dashed line is AC voltage $V_{AC}$ corresponding to the target voltage. Since the frequency of the gate drive pulse is much higher (for example, 20 kHz) than the frequency (50 or 60 Hz) of the AC voltage $V_{AC}$, each pulse cannot be depicted, but the pulse width becomes the broadest at the peak of the absolute value of the AC waveform, and becomes narrower as the absolute value approaches zero.

Figure 4:
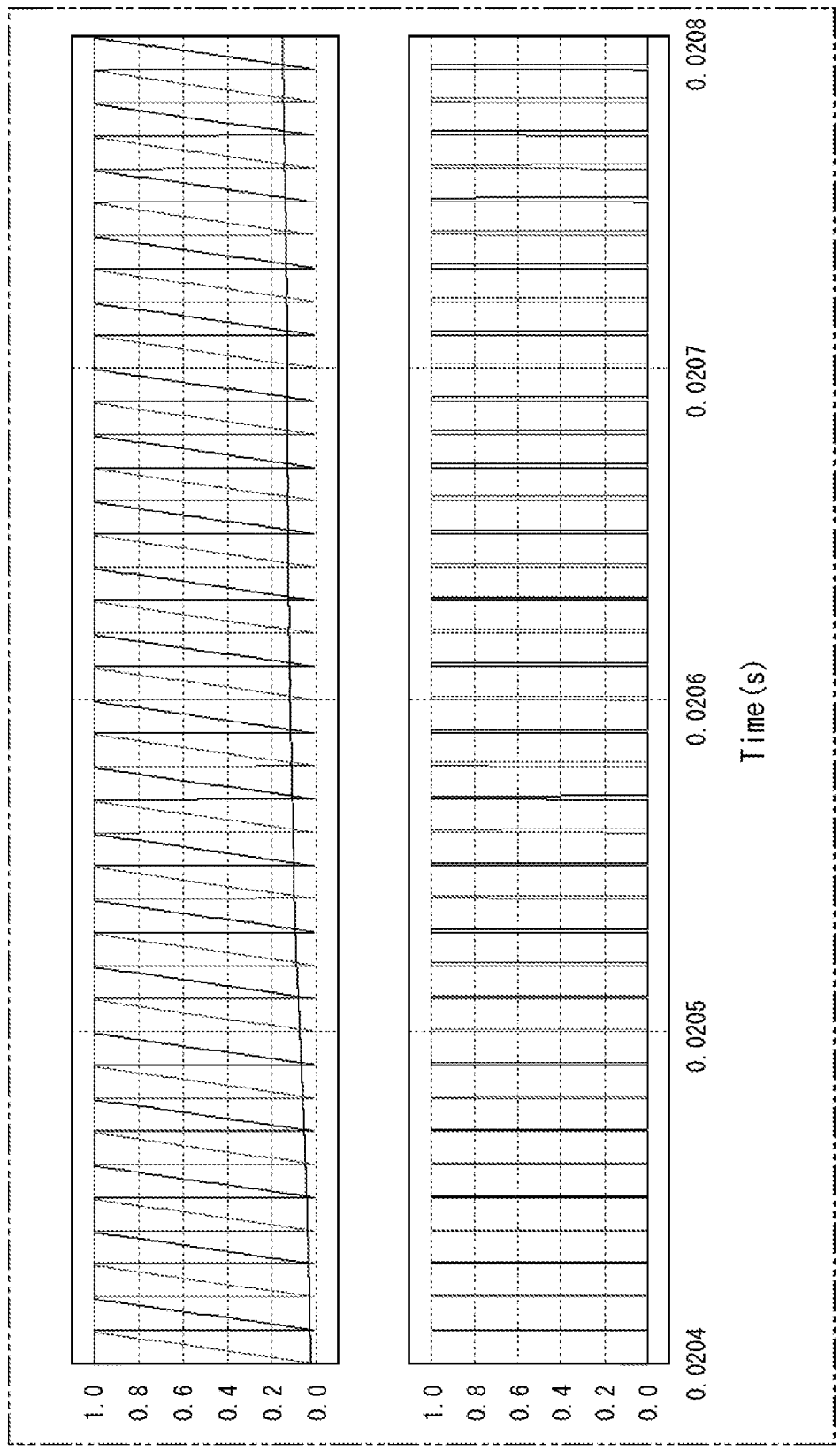
FIG. 4 is a diagram showing an example of the manner of generation of the gate drive pulse.

FIG. 4 is a diagram showing an example of the manner of generation of the gate drive pulse. The upper graph shows a high-frequency carrier wave and the absolute value of a sine wave of an AC waveform as a reference wave. Since the horizontal axis indicates very short times in an enlarged manner, the reference wave appears to be a straight line, but actually is a part rising from zero toward π/2, for example. As for the carrier wave, two waveforms (thick line and thin line) are shown in an overlapped manner, and they are two trapezoidal waveforms temporally shifted from each other by half cycle. That is, in one cycle of each trapezoidal waveform, the waveform obliquely rises and keeps the level one during a certain period, and then sharply falls to zero. Such a waveform arises consecutively, and two sets of such waveforms are shifted from each other by half cycle.

By comparing the carrier wave and the reference wave as described above, a pulse corresponding to an interval where the absolute value of the sine wave is greater than the carrier wave is generated, whereby a gate drive pulse subjected to PWM control is obtained as shown in the lower graph. Regarding the gate drive pulse, a pulse for turning on the switching elements Q1 and Q4 and a pulse for turning on the switching elements Q2 and Q3 are alternately outputted. Thus, positive voltage and negative voltage are alternately and equally applied to the primary winding of the isolation transformer 12. In the vicinity of zero cross of the reference wave (sine wave), a pulse width hardly arises, and therefore, as shown in FIG. 3, the vicinity of zero cross is substantially a region where no gate drive pulse is outputted.

The output of the full-bridge circuit 11 driven by the above gate drive pulse is transformed at a predetermined turn ratio by the isolation transformer 12, and thereafter, rectified by the rectifier circuit 13 and smoothed by the capacitor 14. The smoothing acts to the extent that eliminates the trace of the high-frequency switching, but cannot smooth a low-frequency wave such as a commercial frequency. That is, the capacitance of the capacitor 14 is selected to be a proper value so as to obtain such a result. If the capacitance is much greater than the proper value, the low-frequency wave such as the commercial frequency is also smoothed, whereby the shape of the waveform is made vague. By selecting the proper value, it becomes possible to obtain a desired pulsating DC voltage waveform while eliminating high-frequency voltage variation due to switching.

Even if the gate drive pulse is not given to the rectifier circuit 13 from the control unit 3 (even if the switching elements Q5 to Q8 are all OFF), the rectifier circuit 13 can perform rectification by diodes provided in the elements, but if the gate drive pulse is given, the rectifier circuit 13 can perform synchronous rectification. That is, at the timing when current flows in each diode in the case of performing diode rectification, the gate drive pulses are given to the switching elements Q5 to Q8 from the control unit 3. This realizes synchronous rectification, and current flows through the semiconductor elements, whereby power loss in the rectifier circuit 13 as a whole can be reduced.

Figure 5:
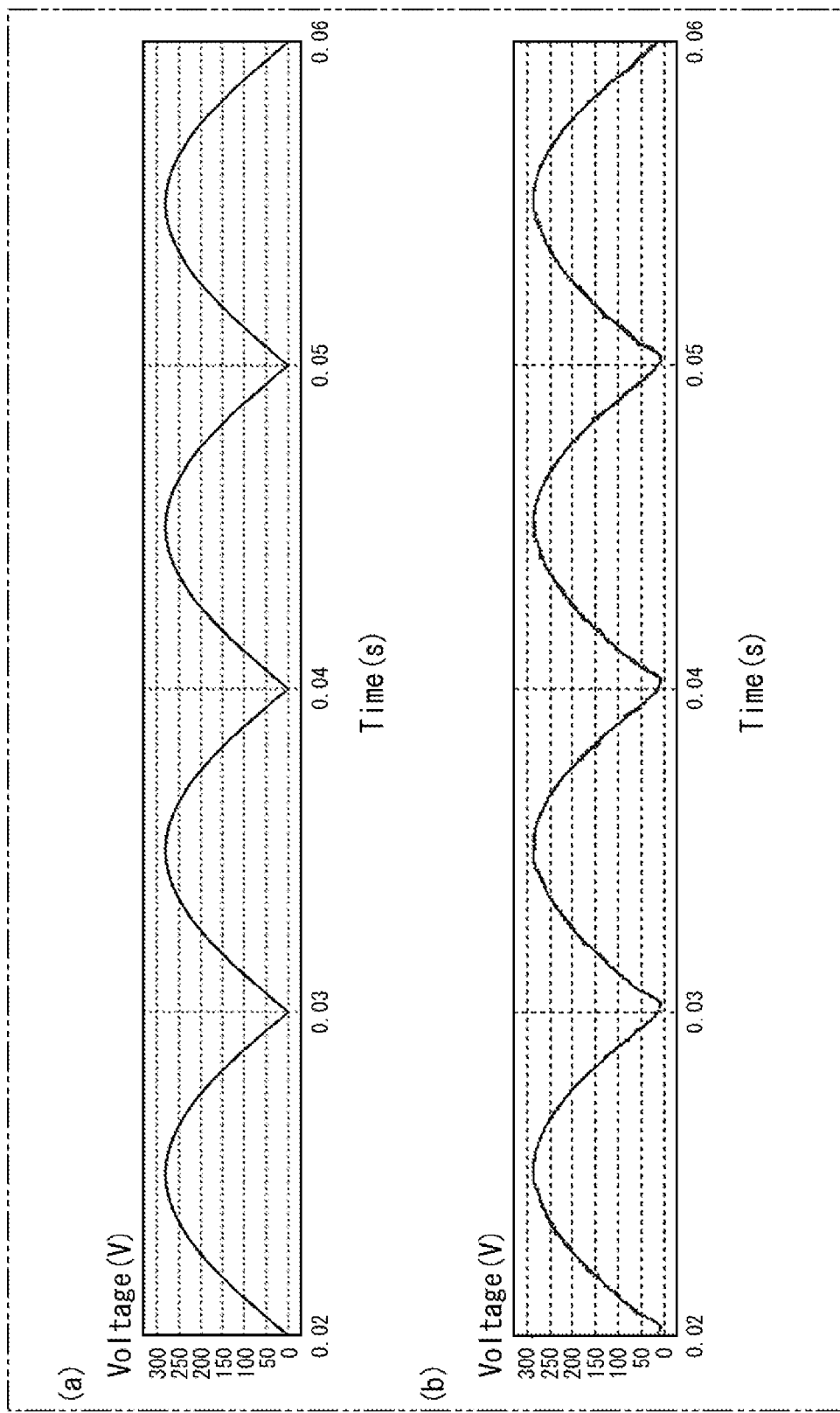
FIG. 5 is graphs in which (a) shows a command value (ideal value) for an output waveform of a first converter, and (b) shows voltage of a pulsating DC voltage waveform that actually arises.

In FIG. 5, (a) shows a command value (ideal value) for the output waveform of the first converter 1 to be obtained as described above. The horizontal axis indicates time, and the vertical axis indicates voltage. That is, this is a pulsating DC voltage waveform obtained by full-wave rectifying the AC waveform of the AC voltage $V_{AC}$. In this case, the frequency of the AC voltage $V_{AC}$ corresponding to the target voltage is, for example, 50 Hz. Therefore, one cycle of the pulsating DC voltage waveform is half of (1/50) seconds=0.02 seconds, i.e., 0.01 seconds. In this example, the wave crest value is 282.8V (=200×2$^{1/2}$), and the effective value is 200V.

In FIG. 5, (b) shows voltage of a pulsating DC voltage waveform that actually arises between both ends of the capacitor 14. As is obvious from comparison with (a), a pulsating DC voltage waveform almost as indicated by the command value can be obtained.

Figure 6:
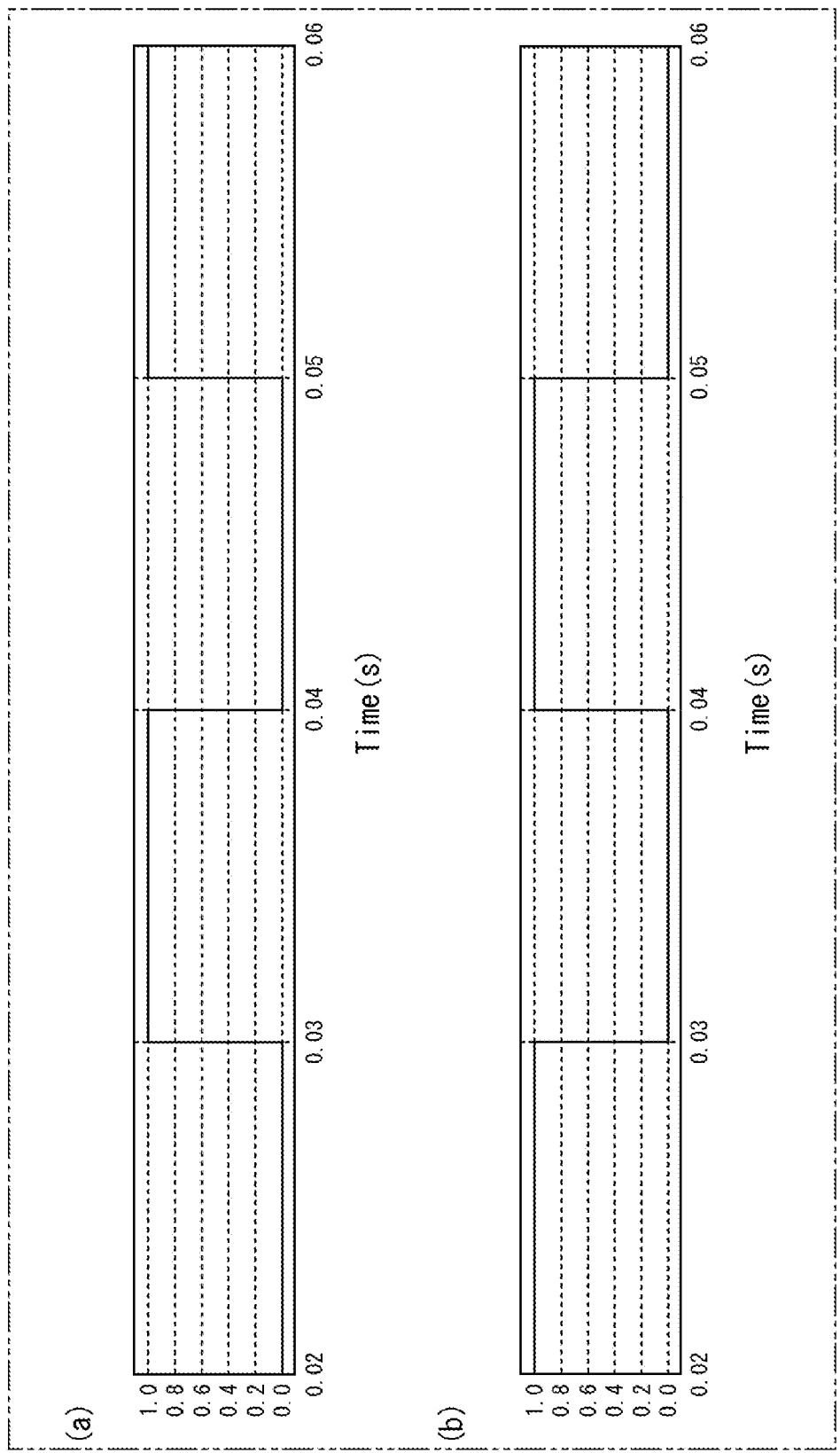
FIG. 6 shows gate drive pulses for switching elements composing a full-bridge inverter of a second converter.

FIG. 6 shows gate drive pulses for the switching elements Q9 to Q12 composing the full-bridge inverter of the second converter 2. In FIG. 6, (a) shows a gate drive pulse for the switching element Q9, Q12, and (b) shows a gate drive pulse for the switching element Q10, Q11. As shown in the graphs, values 1 and 0 arise alternately, whereby the polarity of the pulsating DC voltage waveform in FIG. 5 is inverted per one cycle of the pulsating waveform.

Figure 7:
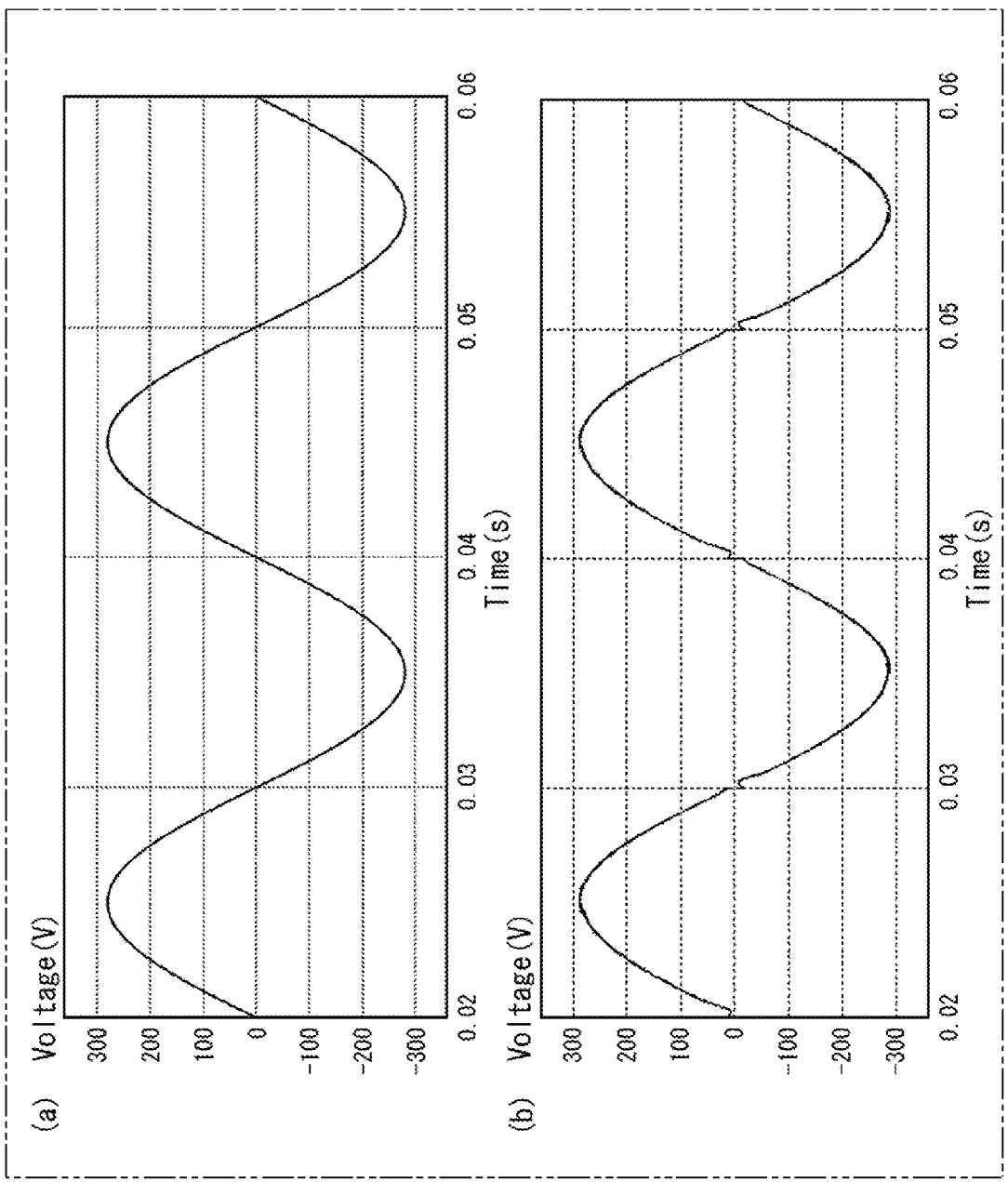
FIG. 7 is graphs showing AC voltage in which (a) shows target voltage (ideal value), and (b) shows voltage actually detected by a voltage sensor.

FIG. 7 is graphs showing the AC voltage $V_{AC}$ outputted as described above, in which (a) is target voltage (ideal value) and (b) is the AC voltage $V_{AC}$ actually detected by the voltage sensor $6_S$. Although there is slight distortion in the vicinity of zero cross, an almost accurate AC waveform is obtained.

As described above, in the conversion device 100, although the hardware configuration of the first converter 1 is a DC/DC converter, the DC voltage is converted to, not mere DC voltage, but a pulsating DC voltage waveform corresponding to the absolute value of the AC waveform. Thus, a waveform as a base of the AC waveform is generated by the first converter 1. Then, the second converter 2 inverts the polarity of the voltage containing the pulsating DC voltage waveform, per one cycle, thereby converting the voltage to the target voltage of the AC waveform.

The number of times of switching in the full-bridge inverter of the second converter 2 in this case is drastically decreased as compared to that in the conventional switching operation. That is, the number of times of switching is drastically decreased (1/200) from a high frequency of, for example, about 20 kHz, to 100 Hz (for example, twice per one cycle of AC at 50 Hz). Since the second converter 2 performs switching at the timing of zero cross, voltage at the time of switching is extremely low (ideally, 0V). Therefore, switching loss in the second converter 2 is greatly reduced. Since the second converter 2 does not perform switching operation accompanied by high-frequency switching, an AC reactor is not needed on the output side of the second converter 2, and thus power loss due to the AC reactor can be eliminated.

Owing to reduction in power loss as described above, the conversion efficiency of the conversion device 100 can be improved.

The capacitor 14 of the first converter 1 only needs to smooth high-frequency voltage variation, but does not smooth the low-frequency pulsating DC voltage waveform. Therefore, a capacitor with a low capacitance (for example, 10 µf or 22 µF) can be used.

Figure 15:
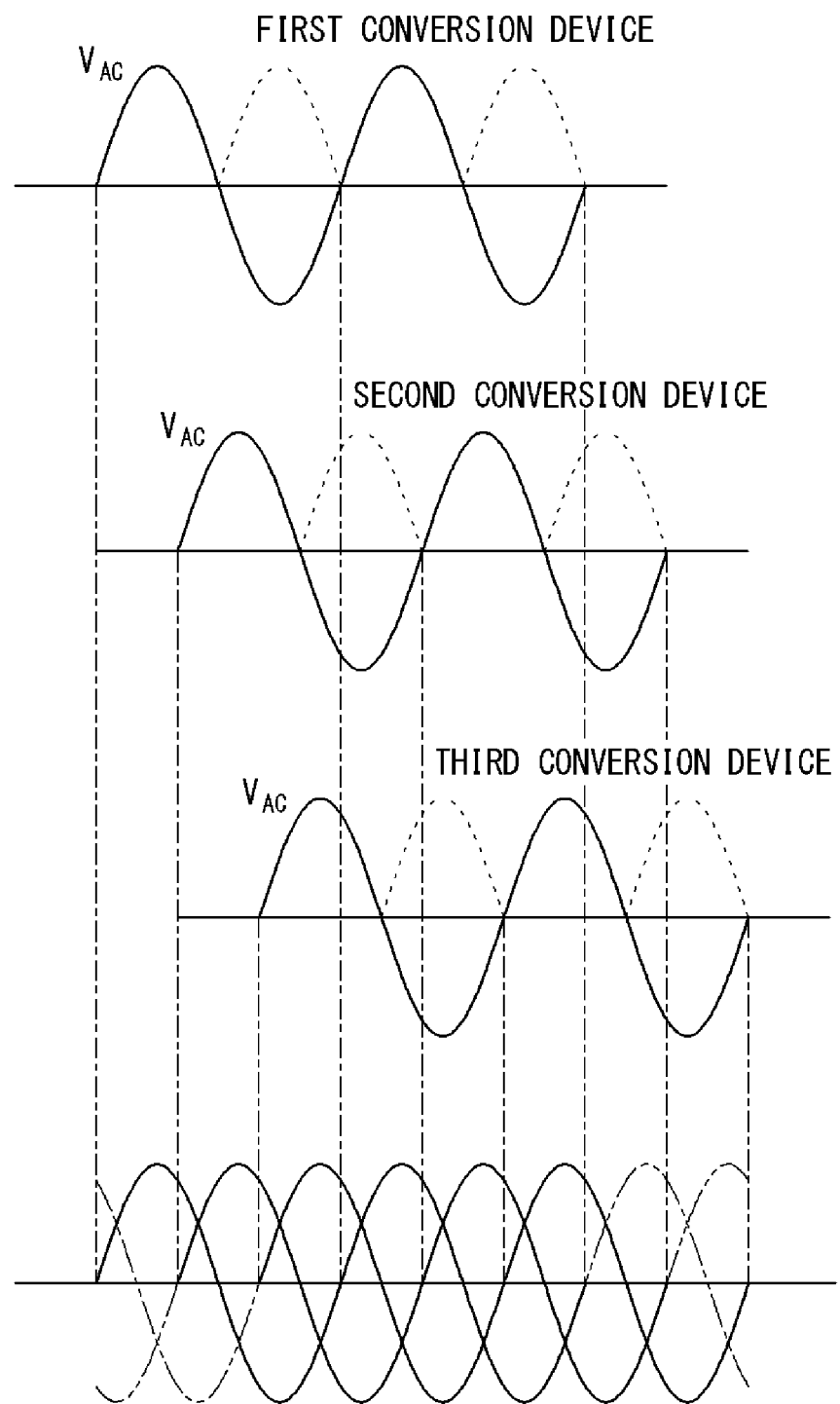
FIG. 15 is a diagram showing the manner of generation of three-phase AC voltage.
Figure 16:
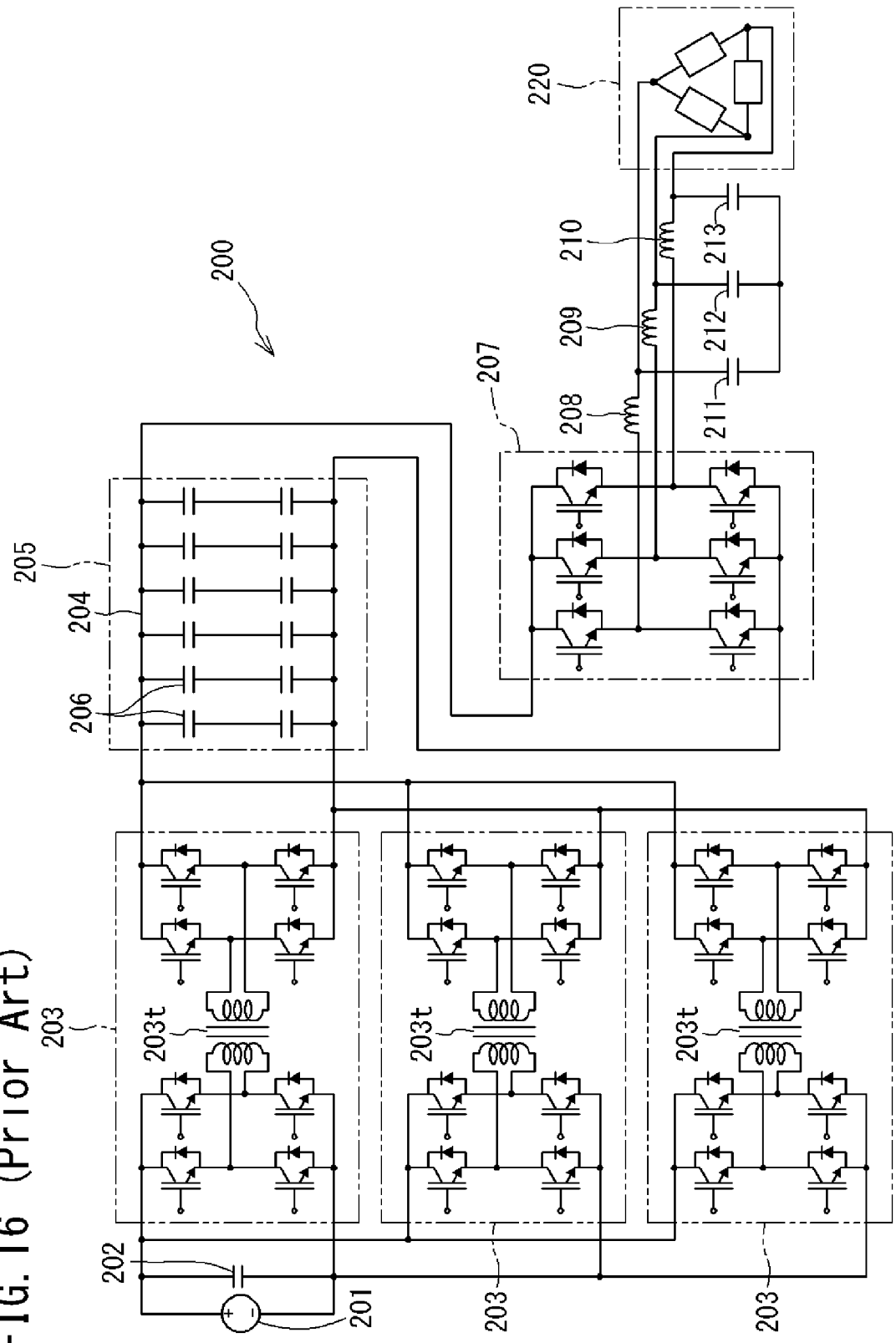
FIG. 16 is an example of a circuit diagram of a conventional power conversion device used in the case of supplying power from a DC power supply to a three-phase AC load.

FIG. 15 is a diagram showing the manner of generation of the three-phase AC voltage.

The control unit 3 controls the conversion devices (first conversion device, second conversion device, third conversion device) 100 for the respective phases so that the phases of AC waveforms outputted therefrom are shifted from each other by (2/3)π. Thus, the power conversion device 100P can apply three-phase AC voltage to the three-phase AC load 6 and supply AC power thereto.

(Supplement)

As described above, the conversion device 100 can be used also for conversion from AC to DC. However, in this case, it is preferable that an AC reactor (which is the same as an AC reactor 23 (FIG. 9) in the second embodiment described later) is interposed on an electric path from the mutual connection point between the switching elements Q9 and Q10 to the capacitor 22.

In this case, the AC reactor and the capacitor 22 form a filter circuit (low-pass filter). In FIG. 2, in the case of feeding power from the AC side, the second converter 2 serves as a "rectifier circuit", and the rectifier circuit 13 of the first converter 1 serves as an "inverter". A high-frequency component generated by the "inverter" is prevented from leaking to the AC side, owing to the presence of the filter circuit.

The full-bridge circuit 11 in this case serves as a "rectifier circuit". The control unit 3 turns on the switching elements Q5 and Q8 and the switching elements Q6 and Q7 alternately at such an appropriate switching frequency that does not magnetically saturate the isolation transformer 12, thus sending power to the isolation transformer 12. Output of the isolation transformer 12 is rectified by the full-bridge circuit 11 serving as a "rectifier circuit", to become DC voltage.

<<Second Embodiment of Three-Phase AC Power Supply Device and Power Conversion Device>>

Figure 8:
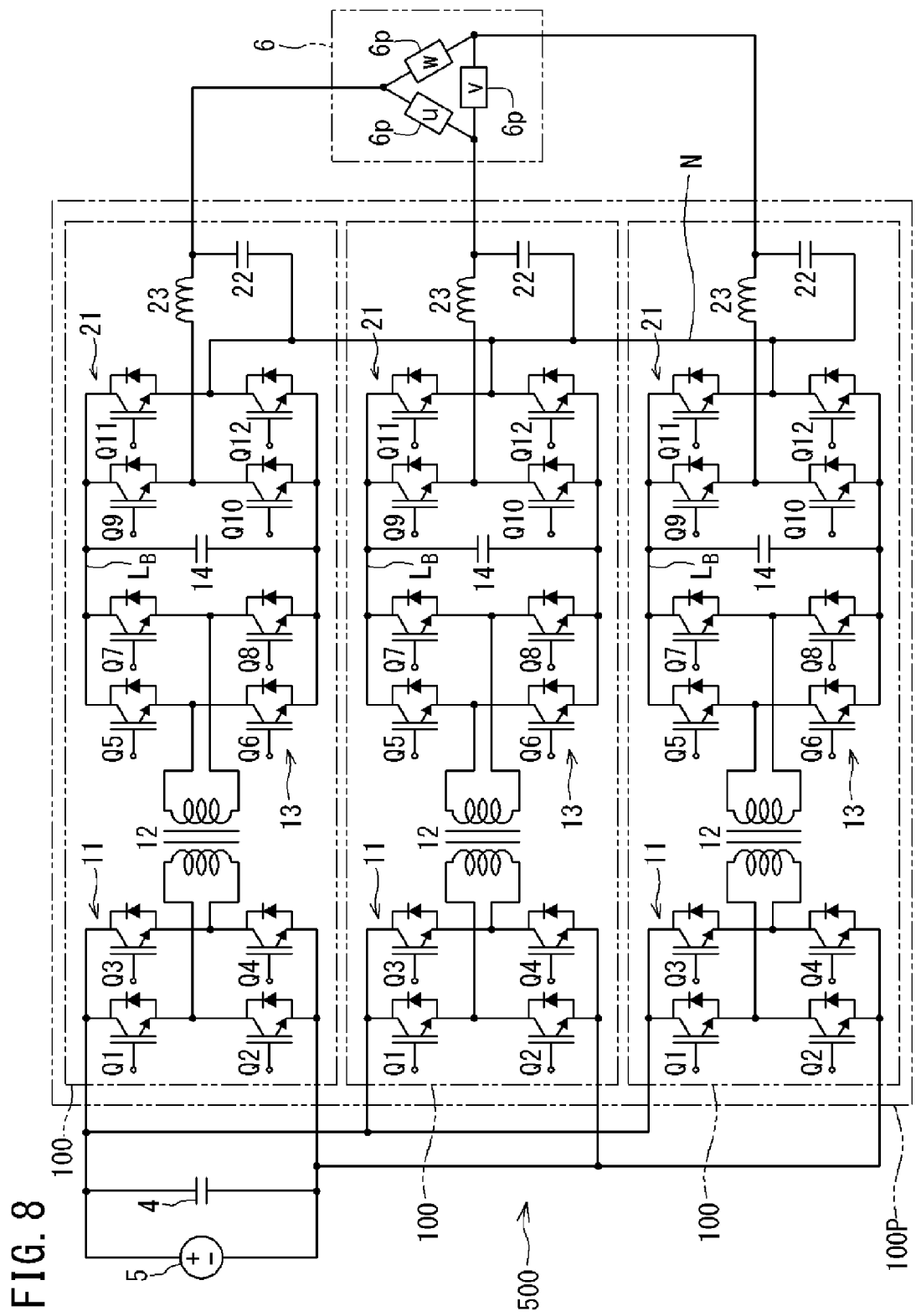
FIG. 8 is a circuit diagram showing a three-phase AC power supply device according to the second embodiment.

FIG. 8 is a circuit diagram showing a three-phase AC power supply device 500 according to the second embodiment. The three-phase AC power supply device 500 includes the power conversion device 100P and the DC power supply 5 composed of, for example, a storage battery, and is connected to the three-phase AC load 6.

Figure 9:
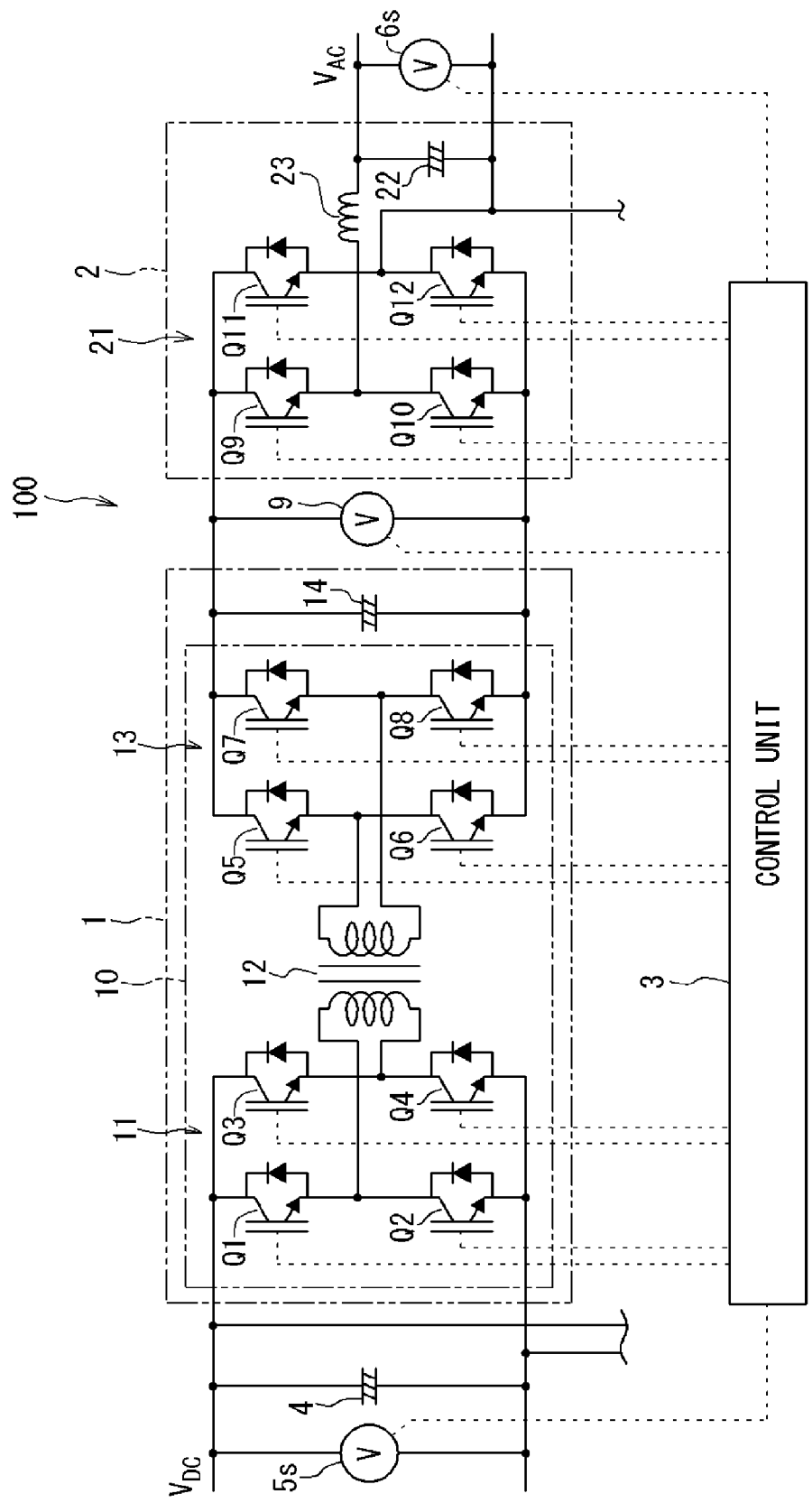
FIG. 9 is a diagram showing in more detail an internal circuit of a conversion device for one phase in FIG. 8.

FIG. 9 is a diagram showing in more detail an internal circuit of a conversion device 100 for one phase in FIG. 8.

FIG. 9 is different from FIG. 2 in that, in FIG. 9, an AC reactor 23 is provided on the output side of the full-bridge inverter 21 in the second converter 2, and a voltage sensor 9 for detecting output voltage of the first converter 1 is provided. The other hardware configuration is the same. The AC reactor 23 and the capacitor 22 compose a filter circuit (low-pass filter) for removing a high-frequency component contained in output of the second converter 2. Information about the voltage detected by the voltage sensor 9 is sent to the control unit 3.

Figure 10:
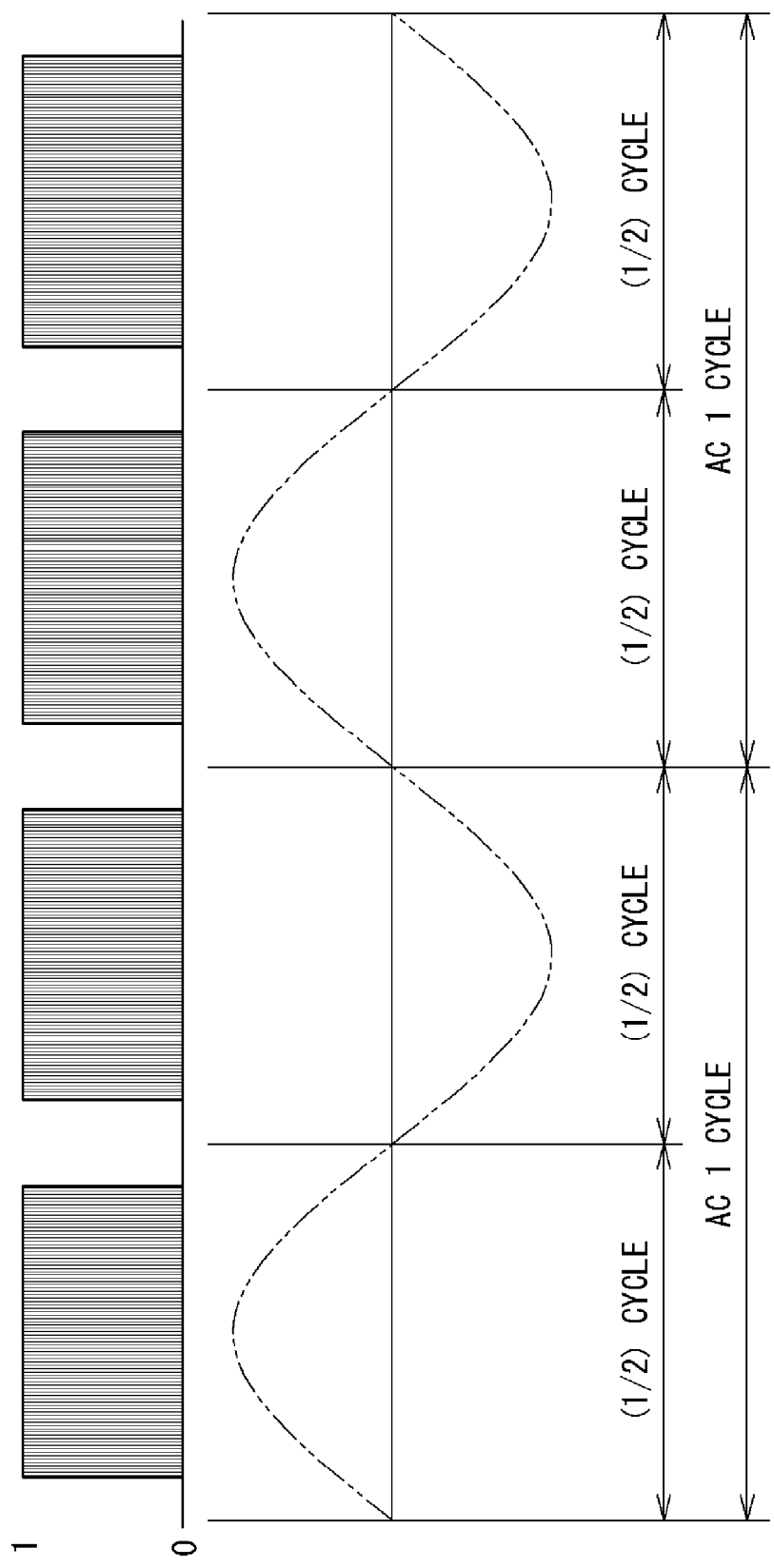
FIG. 10 is a diagram showing a gate drive pulse for a full-bridge circuit.

FIG. 10 is a diagram showing a gate drive pulse for the full-bridge circuit 11. In FIG. 10, a waveform indicated by a two-dot dashed line is AC voltage $V_{AC}$ corresponding to the target voltage. Since the frequency of the gate drive pulse is much higher (for example, 20 kHz) than the frequency (50 or 60 Hz) of the AC voltage $V_{AC}$, each pulse cannot be depicted, but the pulse width becomes the broadest at the peak of the absolute value of the AC waveform, and becomes narrower as the absolute value approaches zero. A difference from FIG. 3 is that, in the vicinity of zero cross of the AC waveform, no gate drive pulse is outputted in a region wider than that in FIG. 3.

Figure 11:
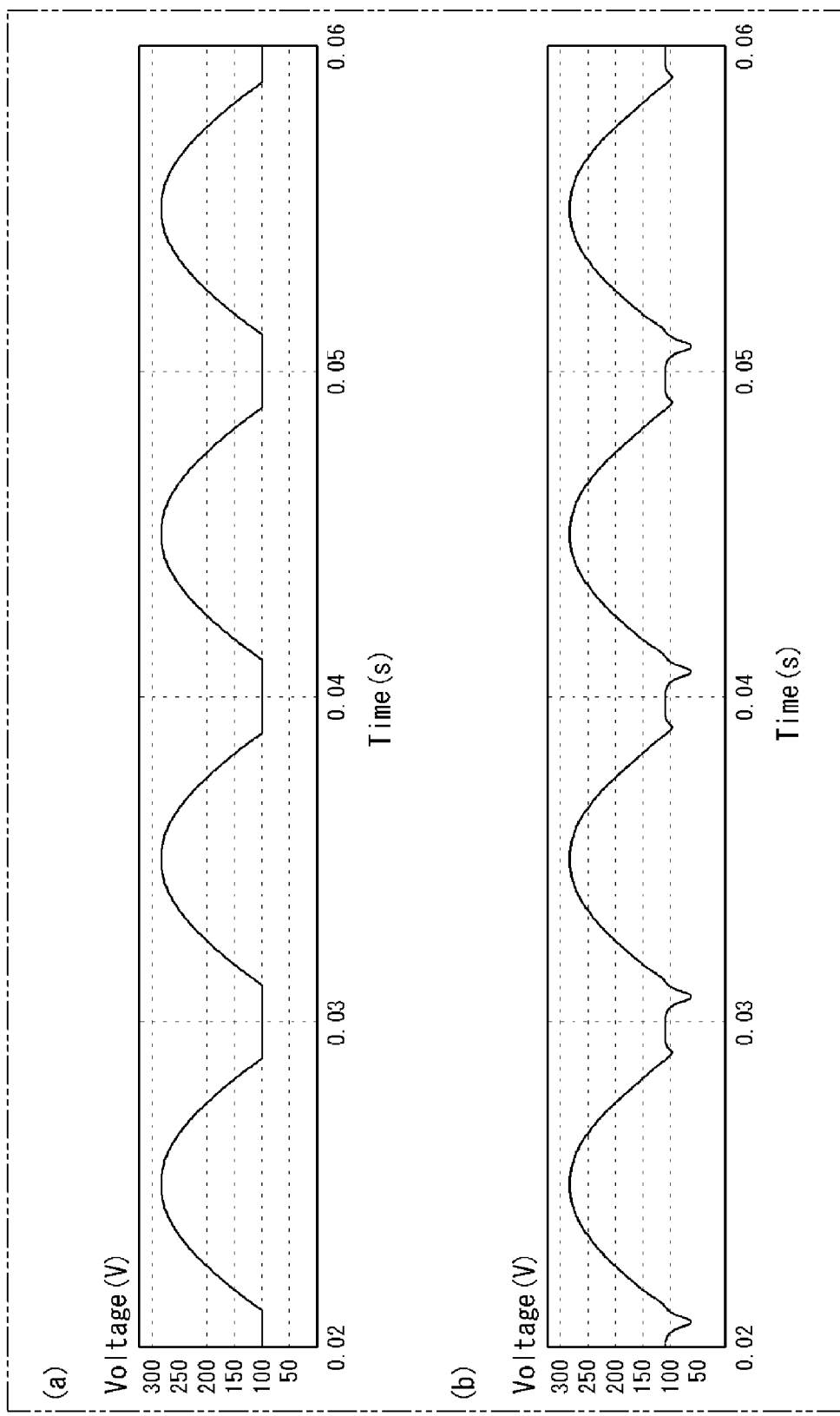
FIG. 11 is graphs in which (a) shows a command value (ideal value) for an output waveform of a first converter to be obtained by the gate drive pulse in FIG. 10, and (b) shows voltage of a pulsating DC voltage waveform that actually arises.

In FIG. 11, (a) shows a command value (ideal value) for the output waveform of the first converter 1 to be obtained by the gate drive pulse in FIG. 10. The horizontal axis indicates time, and the vertical axis indicates voltage. That is, this contains a pulsating DC voltage waveform like a waveform obtained by full-wave rectifying the AC waveform of the AC voltage $V_{AC}$. In this case, the frequency of the AC voltage $V_{AC}$ corresponding to the target voltage is, for example, 50 Hz. Therefore, one cycle of the pulsating DC voltage waveform is half of (1/50) seconds=0.02 seconds, i.e., 0.01 seconds. In this example, the wave crest value is 282.8 (=200×$2^{1/2}$)V.

In FIG. 11, (b) shows voltage of a pulsating DC voltage waveform that actually arises between both ends of the capacitor 14. As is obvious from comparison with (a), a pulsating DC voltage waveform almost as indicated by the command value can be obtained, but the waveform is slightly distorted in a period during which the voltage thereof is equal to or lower than a predetermined proportion of the wave crest value of the target voltage, for example, equal to or lower than 100V.

Figure 12:
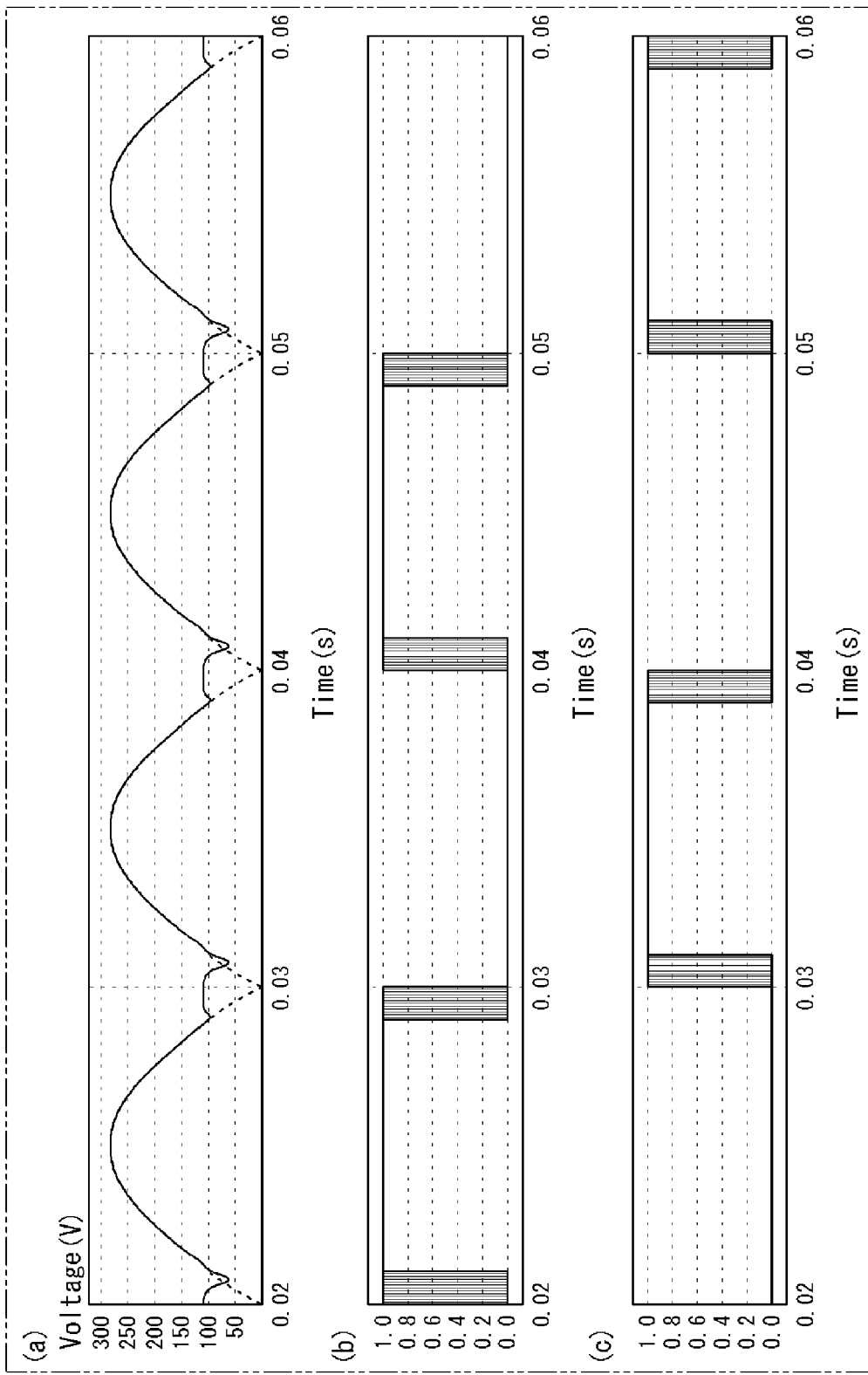
FIG. 12 is graphs in which (a) shows a graph obtained by additionally depicting the waveform of target voltage in the vicinity of zero cross by dot lines on the same graph as (b) in FIG. 11, and (b) and (c) show gate drive pulses for the switching elements composing a full-bridge inverter of a second converter.

In FIG. 12, (a) is a graph obtained by additionally depicting the waveform of the target voltage in the vicinity of zero cross by dot lines on the same graph as (b) in FIG. 11. In FIG. 12, (b) and (c) show gate drive pulses for the switching elements Q9 to Q12 composing the full-bridge inverter of the second converter 2. That is, (b) shows the gate drive pulse for the switching element Q9, Q12, and (c) shows the gate drive pulse for the switching element Q10, Q11. In the region in which thin lines along the vertical direction are depicted in the graphs, PWM control is performed through high-frequency switching.

As shown in FIG. 12, the gate drive pulses in (b) and (c) take values 1 and 0 alternately. Thus, the pulsating DC voltage waveform in (a) is inverted per one cycle of the pulsating waveform. Regarding control in (b), i.e., control for the switching elements Q9 and Q12, when the voltage shown in (a) outputted from the first converter 1 is equal to or lower than, for example, 100V, the control unit 3 causes the switching elements Q9 and Q12 to perform high-frequency switching, to perform switching operation. Thus, voltage is outputted from the second converter 2 so as to approach the target voltage in the vicinity of zero cross. Also in (c), similarly, when the voltage outputted from the first converter 1 is equal to or lower than, for example, 100V, the control unit 3 causes the switching elements Q10 and Q11 to perform high-frequency switching, to perform switching operation. Thus, voltage is outputted from the second converter 2 so as to approach voltage corresponding to the target voltage in the vicinity of zero cross.

Figure 13:
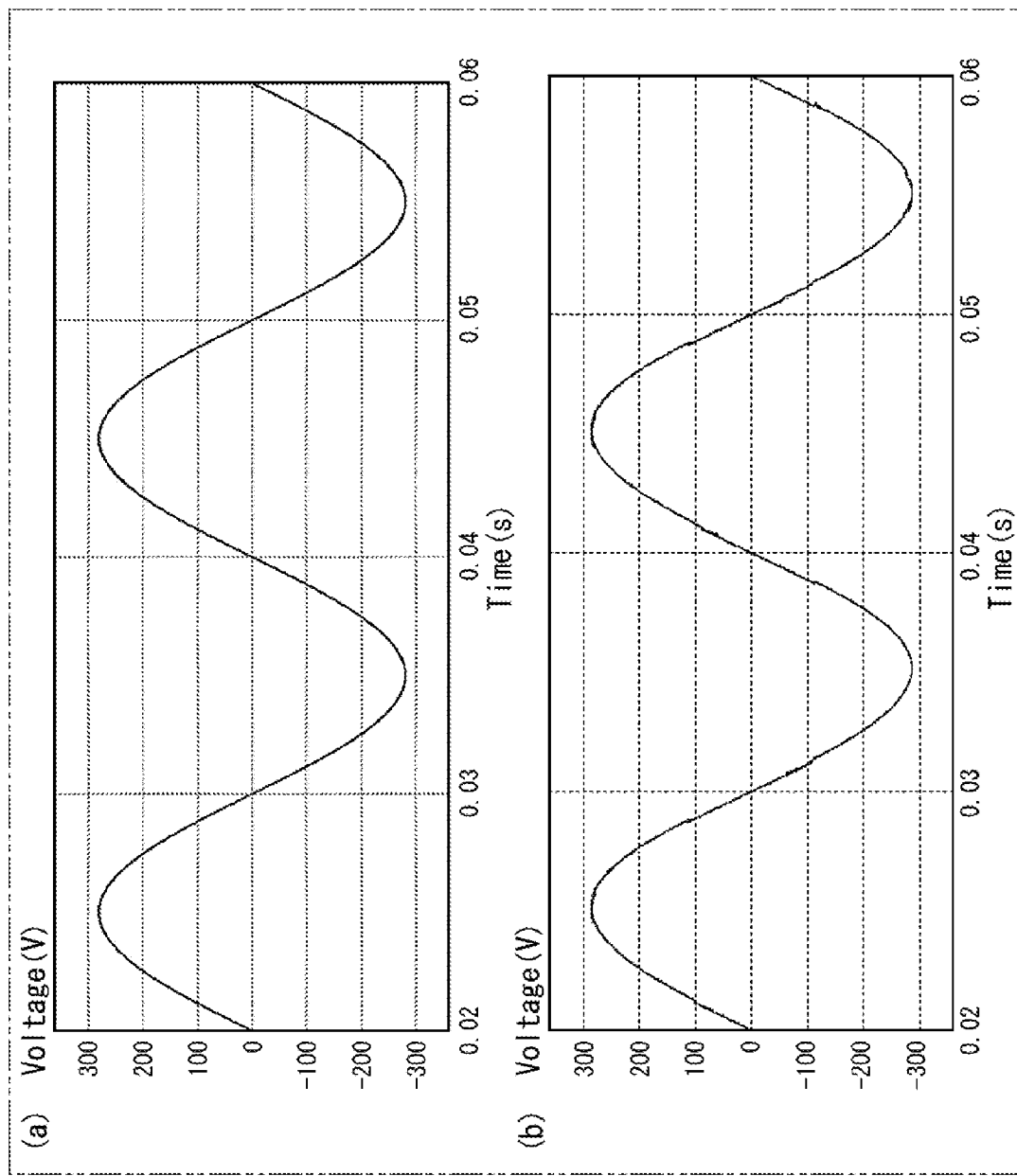
FIG. 13 is graphs showing AC voltage outputted from the second converter via a filter circuit, in which (a) is target voltage (ideal value) and (b) is voltage actually detected by a voltage sensor.

FIG. 13 is graphs showing the AC voltage $V_{AC}$ outputted from the second converter 2 via the filter circuit composed of the AC reactor 23 and the capacitor 22, in which (a) shows target voltage (ideal value) and (b) is the AC voltage $V_{AC}$ actually detected by the voltage sensor $6_S$. As shown in (b), an AC waveform almost as indicated by the target voltage is obtained without distortion in the vicinity of zero cross.

As described above, in the conversion device 100 of the second embodiment, although the hardware configuration of the first converter 1 is a DC/DC converter, the DC voltage is converted to, not mere DC voltage, but a pulsating DC voltage waveform (except for the vicinity of zero cross) corresponding to the absolute value of the AC waveform. Thus, a waveform as a base of the AC waveform is mainly generated by the first converter 1. In addition, the second converter 2 inverts the polarity of the voltage containing the pulsating DC voltage waveform outputted from the first converter 1, per one cycle, thereby converting the voltage to the target voltage of the AC waveform. Further, the second converter 2 performs switching operation only for the vicinity of zero cross, to generate an AC waveform in the vicinity of zero cross, which is not generated by the first converter 1, and outputs the AC waveform.

That is, in this case, in the vicinity of zero cross of the target voltage, the second converter 2 contributes to generation of the AC waveform, and in the other region, the first converter 1 contributes to generation of the AC waveform. In the case where a pulsating DC voltage waveform in the entire region is generated by only the first converter 1, the waveform in the vicinity of zero cross might be distorted. However, by locally using switching operation of the second converter 2, such distortion of the waveform is prevented, and output of a smoother AC waveform can be obtained.

Since the period during which the second converter 2 is caused to perform switching operation is short, loss is much smaller than in the conventional switching operation. In addition, loss due to the AC reactor 23 is also smaller than in the conventional switching operation. Further, the feature that the voltage during the period in the vicinity of zero cross in which switching operation is performed is comparatively low, also contributes to reduction in loss due to switching and loss due to the AC reactor.

Owing to the reduction in loss as described above, the conversion efficiency of the conversion device 100 can be improved, and in addition, output of a smoother AC waveform can be obtained.

The criterion for determining the period during which the second converter 2 is caused to perform high-frequency switching operation is that the voltage is equal to or lower than a predetermined proportion of the wave crest value. In the above example, a threshold value corresponding to a predetermined proportion of the wave crest value of 282.8V is set at 100V. Therefore, the predetermined proportion is 100V/282.8V that is nearly equal to 0.35. However, 100V is a value obtained in consideration of margin, and in (b) of FIG. 5, distortion occurs in a region where the voltage is equal to or lower than 50V. Therefore, the threshold value may be decreased to 50V. In the case of 50V, the predetermined proportion is 50V/282.8V that is nearly equal to 0.18.

Therefore, it is considered that the "predetermined proportion" is preferably 18% to 35%. Also in the case where the effective value of the voltage is not 200V, similarly, the "predetermined proportion" is preferably 18% to 35% of the wave crest value. If the "predetermined proportion" is lower than 18%, there is a possibility that slight distortion is left in the vicinity of zero cross. If the "predetermined proportion" is higher than 35%, the period during which the second converter 2 performs high-frequency switching operation is prolonged, and the effect of loss reduction is decreased by an amount corresponding to the prolonged period.

<<Third Embodiment of Three-Phase AC Power Supply Device and Power Conversion Device>>

Figure 14:
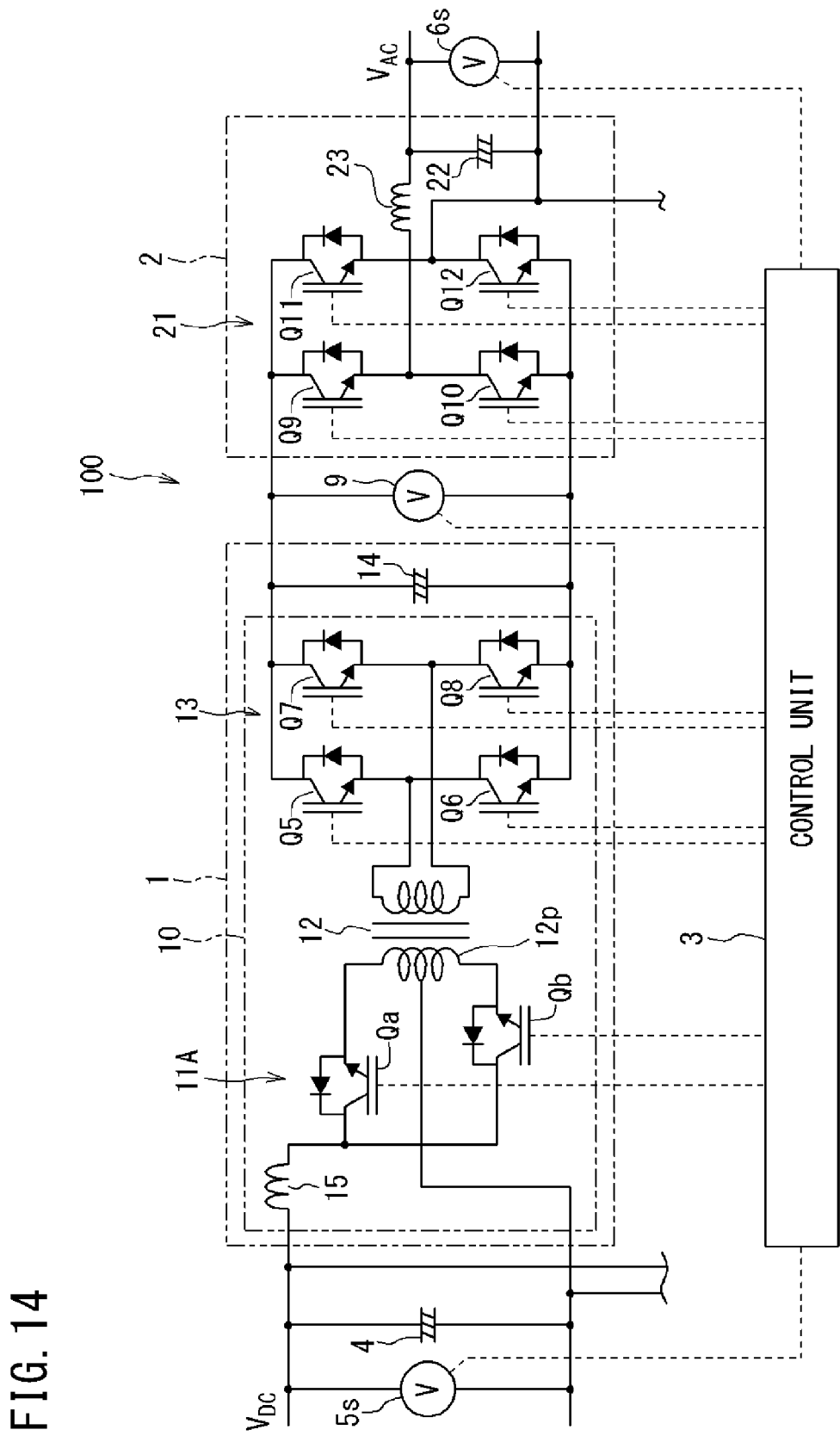
FIG. 14 is a circuit diagram of a conversion device for one phase in a three-phase AC power supply device and a power conversion device according to the third embodiment.

FIG. 14 is a circuit diagram of a conversion device 100 for one phase in a three-phase AC power supply device and a power conversion device according to the third embodiment. Here, a diagram corresponding to FIG. 8 is omitted. That is, the three-phase AC power supply device and the power conversion device according to the third embodiment are obtained by replacing the conversion devices 100 in FIG. 8 with the conversion devices 100 in FIG. 14.

In FIG. 14, a difference from FIG. 9 (second embodiment) is that a winding 12p on the primary side (left side in FIG. 14) of the isolation transformer 12 is provided with a center tap, and a part corresponding to the full-bridge circuit 11 in FIG. 9 is a push-pull circuit 11A using the center tap. The push-pull circuit 11A includes a DC reactor 15 and switching elements Qa and Qb, which are connected as shown in FIG. 14. The switching elements Qa and Qb are subjected to PWM control by the control unit 3, and during operation of the push-pull circuit 11A, when one of the switching elements Qa and Qb is ON, the other one is OFF.

In FIG. 14, current due to the DC voltage $V_{DC}$ passes from the DC reactor 15 through one of the switching elements Qa and Qb that is turned on, and then flows into the isolation transformer 12 and flows out from the center tap. By repeatedly turning on and off the switching elements Qa and Qb alternately, the isolation transformer 12 can perform voltage transformation. By performing PWM control of the gate drive pulses for the switching elements Qa and Qb, the same function as that of the first converter 1 in the second embodiment can be achieved.

That is, a command value (ideal value) for the output waveform of the first converter 1 in the third embodiment is shown in (a) of FIG. 11 as in the second embodiment.

In addition, the gate drive pulse for the switching element Q9, Q12 composing the full-bridge inverter 21 of the second converter 2, and the gate drive pulse for the switching element Q10, Q11 composing the full-bridge inverter 21 of the second converter 2, are respectively shown in (b) and (c) of FIG. 12 as in the second embodiment.

Thus, as in the second embodiment, an AC waveform almost as indicated by the command voltage is obtained as shown in (b) of FIG. 13.

As described above, the conversion device 100 of the third embodiment can realize the same function as in the second embodiment, and can obtain output of a smooth AC waveform. In the push-pull circuit 11A, the number of switching elements is decreased as compared to that in the full-bridge circuit 11 (FIG. 9) of the second embodiment, and therefore, switching loss is reduced by an amount corresponding to the decrease in the number of switching elements.

<<Others>>

In the above embodiments, the case where the power conversion device 100P is connected to the three-phase AC load 6 has been described. However, the power conversion device 100P may be connected to a single-phase load or a power grid.

The conversion devices 100 of the first to third embodiments can be widely used for a power supply system (mainly for business purpose), a stand-alone power supply, a UPS, and the like for supplying AC power from a DC power supply such as a storage battery.

In FIG. 1 or FIG. 8, the configuration in which DC voltage is inputted from the common DC power supply 5 to the three conversion devices 100 has been shown. Such a feature that a common DC power supply can be used is also an advantage of the conversion device 100 using the isolation transformer 12. However, without limitation to usage of a common DC power supply, DC power supplies may be provided for the plurality of conversion devices individually.

It is noted that the embodiments disclosed herein are merely illustrative in all aspects and should not be recognized as being restrictive. The scope of the present invention is defined by the scope of the claims and is intended to include meaning equivalent to the scope of the claims and all modifications within the scope.

REFERENCE SIGNS LIST 1 first converter
2 second converter
3 control unit
4 capacitor
5 DC power supply
$5_S$ voltage sensor
6 three-phase AC load
6p phase load
$6_S$ voltage sensor
9 voltage sensor
10 DC/DC converter
11 full-bridge circuit
11A push-pull circuit
12 isolation transformer
12p primary-side winding
13 rectifier circuit
14 capacitor
15 DC reactor
21 full-bridge inverter
22 capacitor
23 AC reactor
100 conversion device
100P power conversion device
500 three-phase AC power supply device
$L_B$ DC bus
N neutral point
Q1 to Q12, Qa, Qb switching element

The invention claimed is:

1. A power conversion device for converting DC voltage inputted from a DC power supply, to three-phase AC voltage, the power conversion device comprising:
a first-phase conversion device configured to convert the DC voltage inputted from the DC power supply, to voltage having an AC waveform to be outputted to a first phase with respect to a neutral point of three-phase AC;
a second-phase conversion device configured to convert the DC voltage inputted from the DC power supply, to voltage having an AC waveform to be outputted to a second phase with respect to the neutral point;
a third-phase conversion device configured to convert the DC voltage inputted from the DC power supply, to voltage having an AC waveform to be outputted to a third phase with respect to the neutral point; and
a control unit configured to control the first-phase conversion device, the second-phase conversion device, and the third-phase conversion device, wherein
each of the first-phase conversion device, the second-phase conversion device, and the third-phase conversion device includes:
a first converter having a DC/DC converter including an isolation transformer, and a smoothing capacitor, the first converter converting, by the DC/DC converter controlled by the control unit, the inputted DC voltage to a first voltage waveform containing at least a part of waveform corresponding to an absolute value of every half cycle of the AC waveform; and
a second converter provided at a stage subsequent to the first converter and having a full-bridge inverter, the second converter inverting, by the full-bridge inverter controlled by the control unit, a polarity of the first voltage waveform, per one cycle, thereby converting the first voltage waveform to a second voltage waveform having the AC waveform.

2. The power conversion device according to claim 1, wherein the first converter converts the DC voltage to the first voltage waveform having an absolute value of every half cycle of the AC waveform.

3. The power conversion device according to claim 1, wherein
during a period in which the voltage outputted from the first converter is equal to or lower than a predetermined proportion of a wave crest value of the first voltage waveform, the control unit causes the full-bridge inverter to perform inverter operation at a high frequency, thereby generating voltage having the AC waveform in the period.

4. The power conversion device according to claim 3, wherein
the predetermined proportion is 18% to 35%.

5. The power conversion device according to claim 1, wherein
the capacitor has such a capacitance that allows high-frequency voltage variation due to switching in the first converter to be smoothed but does not allow the first voltage waveform to be smoothed.

6. A three-phase AC power supply device comprising:
a DC power supply;
a first-phase conversion device configured to convert DC voltage inputted from the DC power supply, to voltage having an AC waveform to be outputted to a first phase with respect to a neutral point of three-phase AC;
a second-phase conversion device configured to convert DC voltage inputted from the DC power supply, to voltage having an AC waveform to be outputted to a second phase with respect to the neutral point;
a third-phase conversion device configured to convert DC voltage inputted from the DC power supply, to voltage having an AC waveform to be outputted to a third phase with respect to the neutral point; and
a control unit configured to control the first-phase conversion device, the second-phase conversion device, and the third-phase conversion device, wherein
each of the first-phase conversion device, the second-phase conversion device, and the third-phase conversion device includes:
a first converter having a DC/DC converter including an isolation transformer, and a smoothing capacitor, the first converter converting, by the DC/DC converter controlled by the control unit, the inputted DC voltage to a first voltage waveform containing at least a part of waveform corresponding to an absolute value of every half cycle of the AC waveform; and
a second converter provided at a stage subsequent to the first converter and having a full-bridge inverter, the second converter inverting, by the full-bridge inverter controlled by the control unit, a polarity of the first voltage waveform, per one cycle, thereby converting the first voltage waveform to a second voltage waveform having the AC waveform.

7. The power conversion device according to claim 2, wherein
the capacitor has such a capacitance that allows high-frequency voltage variation due to switching in the first converter to be smoothed but does not allow the first voltage waveform to be smoothed.

8. The power conversion device according to claim 3, wherein
the capacitor has such a capacitance that allows high-frequency voltage variation due to switching in the first converter to be smoothed but does not allow the first voltage waveform to be smoothed.

9. The power conversion device according to claim 4, wherein
the capacitor has such a capacitance that allows high-frequency voltage variation due to switching in the first converter to be smoothed but does not allow the first voltage waveform to be smoothed.

* * * * *